United States Patent
Sengupta et al.

(10) Patent No.: US 11,419,041 B2
(45) Date of Patent: Aug. 16, 2022

(54) CELL ACQUISITION SUBFRAME ENHANCEMENTS FOR CELLULAR BROADCAST SERVICES

(71) Applicant: QUALCOMM Incorporated, San Diego, CA (US)

(72) Inventors: Ayan Sengupta, San Diego, CA (US); Alberto Rico Alvarino, San Diego, CA (US); Amer Catovic, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 16/855,721

(22) Filed: Apr. 22, 2020

(65) Prior Publication Data

US 2020/0344672 A1    Oct. 29, 2020

Related U.S. Application Data

(60) Provisional application No. 62/838,205, filed on Apr. 24, 2019.

(51) Int. Cl.
*H04W 48/12* (2009.01)
*H04W 48/16* (2009.01)
*H04W 72/04* (2009.01)

(52) U.S. Cl.
CPC ........... *H04W 48/12* (2013.01); *H04W 48/16* (2013.01); *H04W 72/042* (2013.01)

(58) Field of Classification Search
CPC .... H04W 48/12; H04W 48/16; H04W 72/042
See application file for complete search history.

(56) References Cited

U.S. PATENT DOCUMENTS

| 11,191,008 B2* | 11/2021 | Bergqvist | .............. H04W 48/12 |
| 2013/0194931 A1 | 8/2013 | Lee et al. | |
| 2013/0242882 A1 | 9/2013 | Blankenship et al. | |
| 2015/0373668 A1 | 12/2015 | Lee et al. | |

FOREIGN PATENT DOCUMENTS

| WO | 2013170227 A1 | 11/2013 | |
| WO | WO-2018083678 A1 * | 5/2018 | ............ H04W 48/12 |
| WO | WO-2018085335 A1 * | 5/2018 | .......... H04W 72/005 |
| WO | WO-2018085660 A1 * | 5/2018 | .......... H04W 72/005 |

OTHER PUBLICATIONS

International Search Report and Written Opinion—PCT/US2020/029552—ISAEPO—dated Jul. 31, 2020.

* cited by examiner

*Primary Examiner* — Michael J Moore, Jr.
(74) *Attorney, Agent, or Firm* — Harrity & Harrity, LLP; Kevin M. Donnelly

(57) ABSTRACT

Various aspects of the present disclosure generally relate to wireless communication. In some aspects, a user equipment may receive a master information block (MIB) including enhancement information associated with an enhanced cell acquisition subframe (CAS) for a cellular broadcast service. The user equipment may receive the enhanced CAS, associated with the cellular broadcast service, based at least in part on the enhancement information associated with the enhanced CAS. Numerous other aspects are provided.

30 Claims, 15 Drawing Sheets

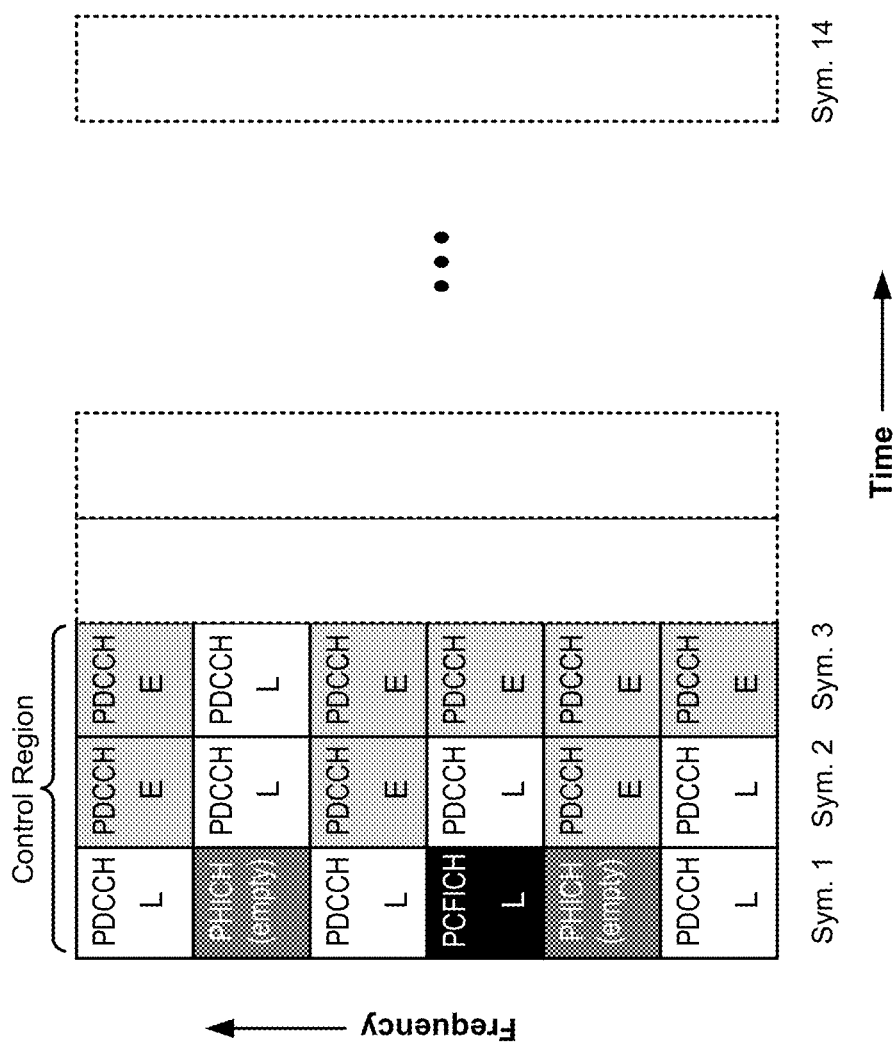

CELL ACQUISITION SUBFRAME ENHANCEMENTS FOR CELLULAR BROADCAST SERVICES

CROSS-REFERENCE TO RELATED APPLICATION

This patent application claims priority to U.S. Provisional Patent Application No. 62/838,205, filed on Apr. 24, 2019, entitled "CELL ACQUISITION SUBFRAME ENHANCEMENTS FOR CELLULAR BROADCAST SERVICES," and assigned to the assignee hereof. The disclosure of the prior Application is considered part of and is incorporated by reference in this Patent Application.

FIELD OF THE DISCLOSURE

Aspects of the present disclosure generally relate to wireless communication, and more specifically to techniques and apparatuses for cell acquisition subframe (CAS) enhancements for cellular broadcast services.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (OFDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A cellular broadcast service may be used to allow one or more base stations to broadcast communications for receipt by any UEs in a geographical area (for example, one or more cells) covered by the broadcast (such that any UE located in the one or more cells can receive the broadcasted communications). An example of a cellular broadcast service is a television service. In order to extend and enhance outreach and capabilities of cellular broadcast services (beyond the outreach and capabilities of cellular broadcast services in a legacy network, such as an LTE network), additional scenarios should be considered. In order to support a cellular broadcast service in these additional scenarios, a design of new numerologies is needed (for example, in terms of OFDM subcarrier spacing, cyclic-prefix length, reference signal design, or the like). However, a challenge in such scenarios is to ensure that cell acquisition information—which informs a UE of details of the cellular broadcast scheme employed in the network—is received reliably by UEs. Ensuring receipt of cell acquisition information is challenging because, to be backward compatible with legacy UEs (for example, LTE UEs) supporting cellular broadcast services, a numerology and a periodicity of a cell acquisition subframe (CAS) cannot be changed. Further, these new scenarios may mean a lower received signal-to-noise ratio (SNR) of channels in the CAS (as compared to scenarios covered in previous releases).

SUMMARY

In some aspects, a method of wireless communication, performed by a user equipment (UE), may include receiving a master information block (MIB) including enhancement information associated with an enhanced cell acquisition subframe (CAS) for a cellular broadcast service; and receiving the enhanced CAS, associated with the cellular broadcast service, based at least in part on the enhancement information associated with the enhanced CAS.

In some aspects, a UE for wireless communication may include memory and one or more processors operatively coupled to the memory. The memory and the one or more processors may be configured to receive a MIB including enhancement information associated with an enhanced CAS for a cellular broadcast service; and receive the enhanced CAS, associated with the cellular broadcast service, based at least in part on the enhancement information associated with the enhanced CAS.

In some aspects, a non-transitory computer-readable medium may store one or more instructions for wireless communication. The one or more instructions, when executed by one or more processors of a UE, may cause the one or more processors to: receive a MIB including enhancement information associated with an enhanced CAS for a cellular broadcast service; and receive the enhanced CAS, associated with the cellular broadcast service, based at least in part on the enhancement information associated with the enhanced CAS.

In some aspects, an apparatus for wireless communication may include means for receiving a MIB including enhancement information associated with an enhanced CAS for a cellular broadcast service; and means for receiving the enhanced CAS, associated with the cellular broadcast service, based at least in part on the enhancement information associated with the enhanced CAS.

In some aspects, a method of wireless communication, performed by a base station, may include transmitting a MIB including enhancement information associated with an enhanced CAS for a cellular broadcast service; and transmitting the enhanced CAS, associated with the cellular broadcast service, based at least in part on the enhancement information associated with the enhanced CAS.

In some aspects, a base station for wireless communication may include memory and one or more processors operatively coupled to the memory. The memory and the one or more processors may be configured to transmit a MIB including enhancement information associated with an enhanced CAS for a cellular broadcast service; and transmit the enhanced CAS, associated with the cellular broadcast service, based at least in part on the enhancement information associated with the enhanced CAS.

In some aspects, a non-transitory computer-readable medium may store one or more instructions for wireless communication. The one or more instructions, when executed by one or more processors of a base station, may cause the one or more processors to: transmit a MIB including enhancement information associated with an enhanced CAS for a cellular broadcast service; and transmit the enhanced CAS, associated with the cellular broadcast service, based at least in part on the enhancement information associated with the enhanced CAS.

In some aspects, an apparatus for wireless communication may include means for transmitting a master information block (MIB) including enhancement information associated with an enhanced CAS for a cellular broadcast service; and means for transmitting the enhanced CAS, associated with the cellular broadcast service, based at least in part on the enhancement information associated with the enhanced CAS.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 7A-7D are diagrams illustrating examples associated with cell acquisition subframe (CAS) enhancements for cellular broadcast services in accordance with various aspects of the present disclosure.

DETAILED DESCRIPTION

Figure 1:
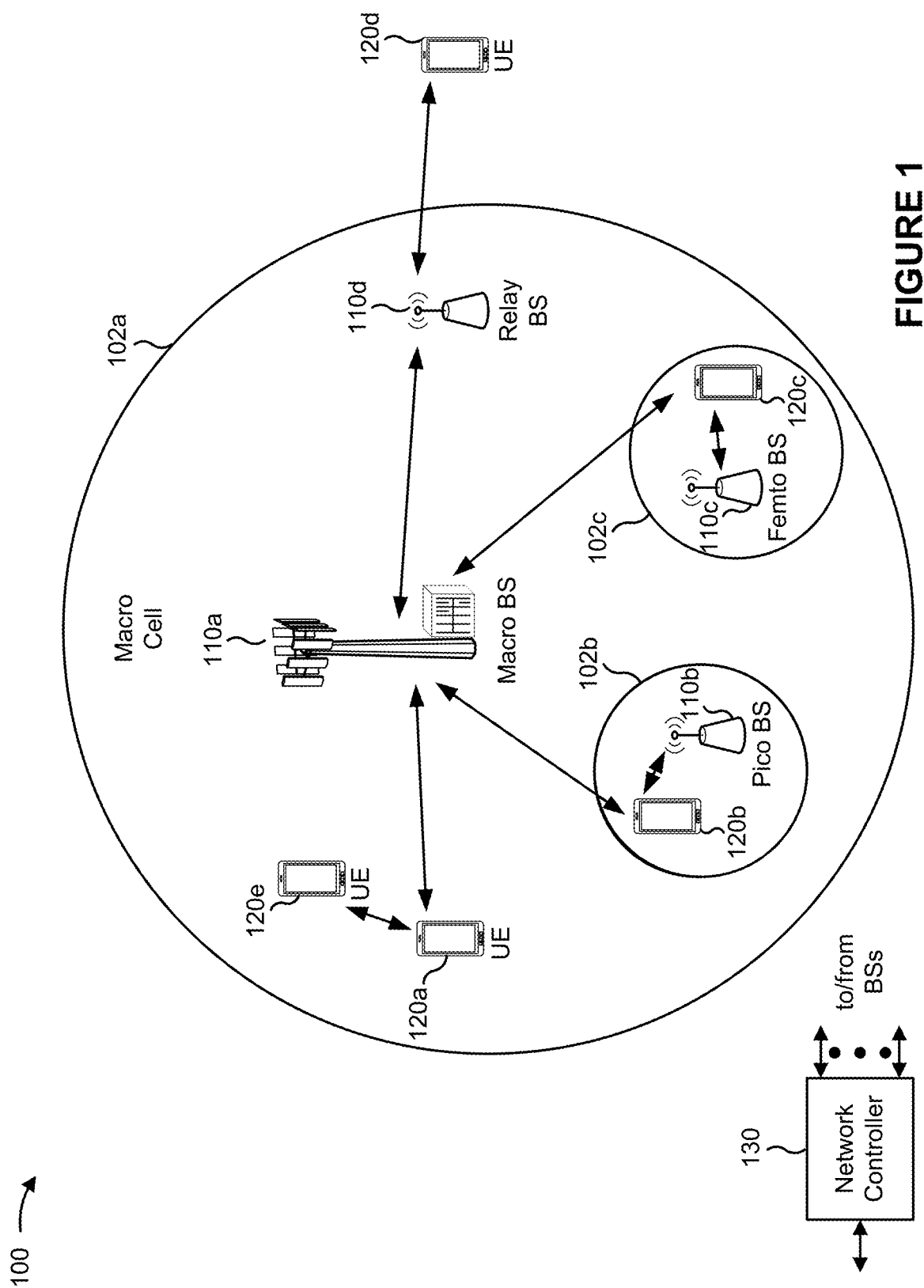
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G or 4G wireless technologies, aspects of the present disclosure can be applied in other generation-based communication systems, such as 5G and later, including NR technologies.

A cellular broadcast service may be used to allow one or more base stations to broadcast communications for receipt by any UEs in a geographical area (for example, one or more cells) covered by the broadcast (such that any UE located in the one or more cells can receive the broadcasted communications). An example of a cellular broadcast service is a television service. In order to extend and enhance outreach and capabilities of cellular broadcast services (beyond the outreach and capabilities of cellular broadcast services in a legacy network, such as an LTE network), various use cases should be considered. Such use cases include, for example, a cellular broadcast service that uses a network with relatively large inter-site-distances (ISDs) between cells (for example, as compared to ISDs in a legacy LTE network), and a cellular broadcast service usable in a high mobility scenario (for example, when a given UE is located in a moving vehicle).

In order to support a cellular broadcast service in such scenarios, a design of new numerologies is needed (for example, in terms of OFDM subcarrier spacing, cyclic-prefix length, reference signal design, or the like). However, a challenge in such scenarios is to ensure that cell acquisition information—which informs a UE of details of the cellular broadcast scheme employed in the network—is received reliably by UEs.

Ensuring receipt of cell acquisition information is challenging because these new scenarios may mean a lower received signal-to-noise ratio (SNR) of channels in the CAS (as compared to scenarios considered in the design of cellular broadcast services for a legacy network). Further, ensuring receipt of cell acquisition information is challenging because, to be backward compatible with legacy UEs (for example, LTE UEs from earlier releases) supporting cellular broadcast services, a numerology and a periodicity of a cell acquisition subframe (CAS) cannot be changed. For example, in an LTE-based broadcast scenario, a CAS carries system information for broadcast (for example, OFDM subcarrier spacings employed in multicast-broadcast single-frequency network (MBSFN) subframes, cyclic prefix length, or the like), as well as the usual synchronization signals. In an LTE system, the CAS is one subframe long, has a periodicity of 40 milliseconds (ms), has legacy LTE numerology (in other words, 15 kHz OFDM subcarrier spacing), carries typical LTE channels (for example, a PDCCH, a PDSCH, a PBCH, a PCFICH, and a physical hybrid automatic repeat request indicator channel (PHICH)), and carries a set of synchronization signals (for example, PSS and SSS). Per LTE specifications, the PDCCH can at most be three symbols in duration (for typical broadcast bandwidths of 10 MHz and above). Notably, in the legacy PDCCH design, the largest size of a PDCCH candidate that a UE monitors in a common search space is eight control channel elements (CCEs)—which maps to 72 resource element groups (REGs) on the time-frequency grid in a specified pattern. A legacy UE can monitor a PDCCH candidate up to this size (in other words, an aggregation level of eight CCEs) and in this specified location. This CAS PDCCH design cannot be affected in order to ensure that a cellular broadcast service is backward compatible with legacy UEs.

Some aspects described herein provide CAS enhancements for cellular broadcast services. In some aspects, the CAS may be enhanced by defining an enhanced PDCCH candidate for monitoring by non-legacy UEs, where the enhanced CAS carries control information that is decodable by legacy UEs. In some aspects, the CAS may be enhanced by utilizing unused PHICH resources in the CAS (for example, to transmit an additional PCFICH, an additional cell-specific reference signal, an additional PDCCH, or the like). In some aspects, the CAS may be enhanced to carry other information associated with improving reception of the cell acquisition information. In some aspects, a master information block (MIB) may be used to carry information associated with the enhanced CAS. Additional details regarding such CAS enhancements are described below.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, a virtual network, or the like, or combinations thereof using any suitable transport network.

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like, or combinations thereof.

UEs 120 (for example, 120a, 120b, 120c) may be dispersed throughout wireless network 100, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like, or combinations thereof), a mesh network, or the like, or combinations thereof. In this case, the UE 120 may perform scheduling operations, resource selection operations, or other operations described elsewhere herein as being performed by the base station 110.

Figure 2:
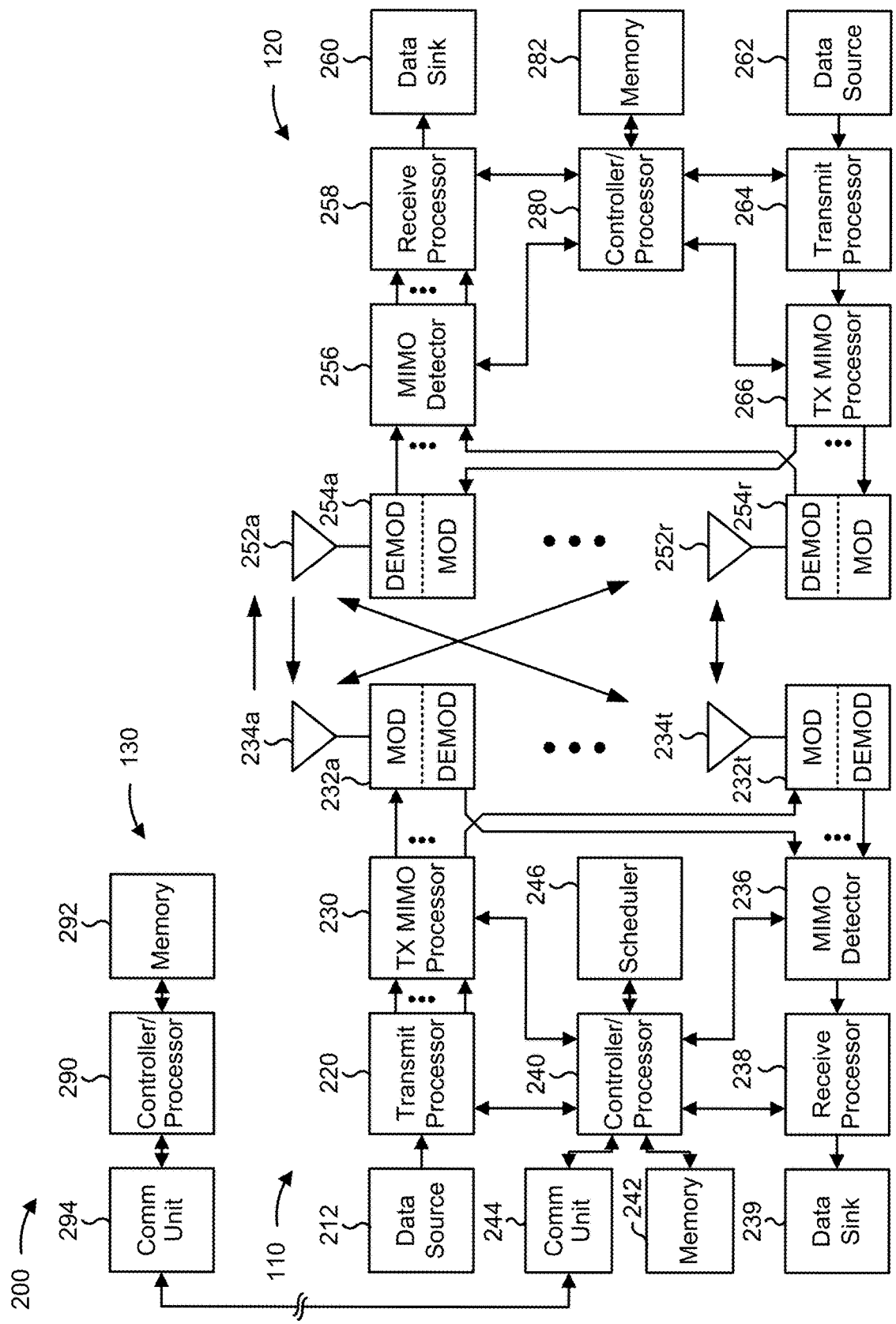
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with cell acquisition subframe enhancements for cellular broadcast services, as described in more detail elsewhere herein. For example, controller/processor 240 of base station 110, controller/processor 280 of UE 120, or any other component(s) of FIG. 2 may perform or direct operations of, for example, process 800 of FIG. 8, process 900 of FIG. 9, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving a master information block (MIB) including enhancement information associated with an enhanced cell acquisition subframe (CAS) for a cellular broadcast service, means for receiving the enhanced CAS, associated with the cellular broadcast service, based at least in part on the enhancement information associated with the enhanced CAS, or the like, or combinations thereof. In some aspects, such means may include one or more components of UE 120 described in connection with FIG. 2.

In some aspects, base station 110 may include means for transmitting a MIB including enhancement information associated with an enhanced CAS for a cellular broadcast service, means for transmitting the enhanced CAS, associated with the cellular broadcast service, based at least in part on the enhancement information associated with the enhanced CAS, or the like, or combinations thereof. In some aspects, such means may include one or more components of base station 110 described in connection with FIG. 2.

Figure 3A:
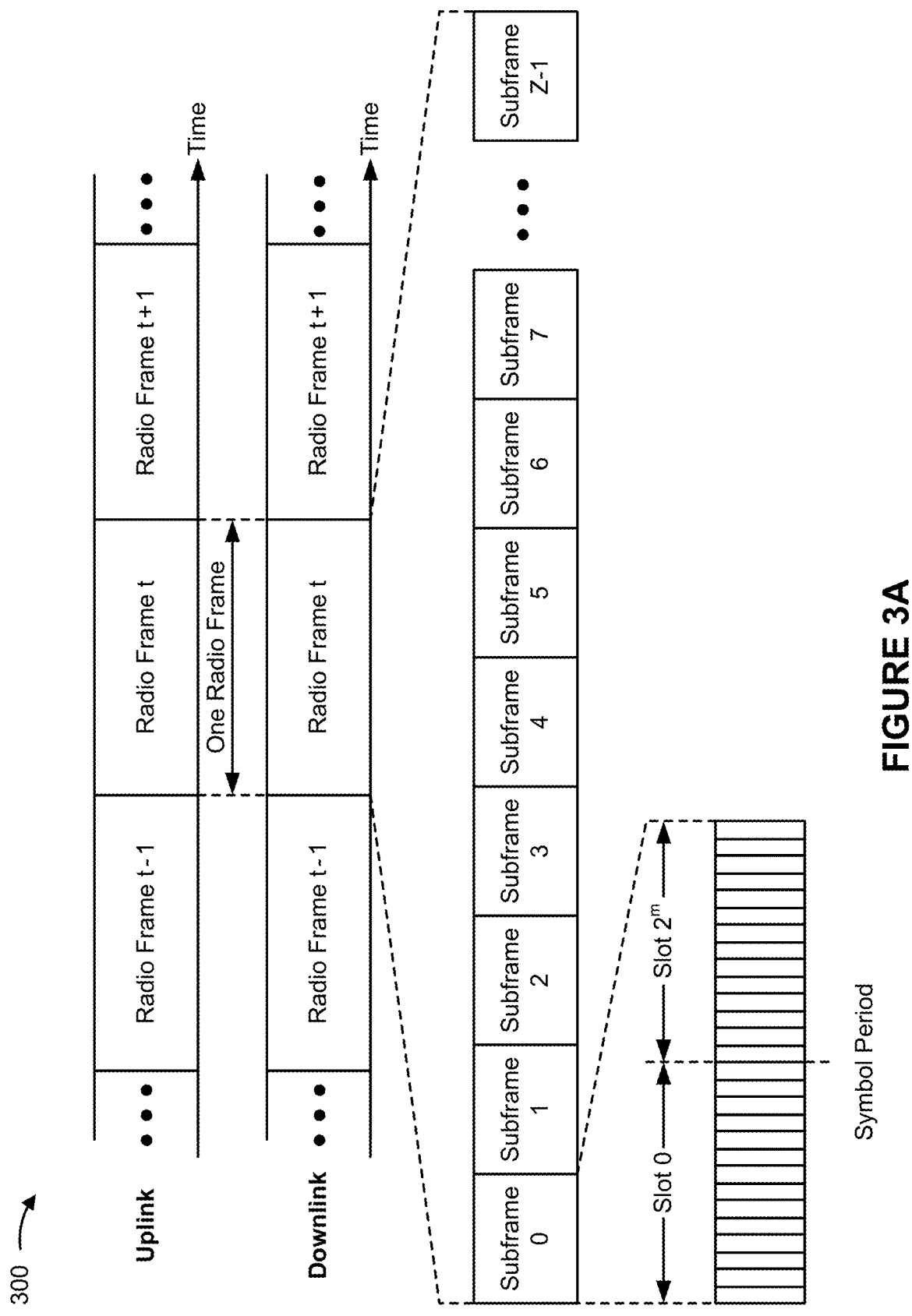
FIG. 3A is a block diagram illustrating an example frame structure for use in a wireless network in accordance with various aspects of the present disclosure.

FIG. 3A is a block diagram illustrating an example frame structure 300 for use in a wireless network in accordance with various aspects of the present disclosure. For example, frame structure 300 may be used for frequency division duplexing (FDD) in a telecommunications system (for example, NR). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z (Z≥1) subframes (for example, with indices of 0 through Z−1). Each subframe may have a predetermined duration (for example, 1 ms) and may include a set of slots (for example, $2^m$ slots per subframe are shown in FIG. 3A, where m is numerology used for a transmission, such as 0, 1, 2, 3, 4, or the like, or combinations thereof). Each slot may include a set of L symbol periods. For example, each slot may include fourteen symbol periods (for example, as shown in FIG. 3A), seven symbol periods, or another quantity of symbol periods. In a case where the subframe includes two slots (for example, when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, or the like, or combinations thereof.

While some techniques are described herein in connection with frames, subframes, slots, or the like, or combinations thereof, these techniques may equally apply to other types of wireless communication structures, which may be referred to using terms other than "frame," "subframe," "slot," or the like, or combinations thereof in 5G NR. In some aspects, a wireless communication structure may refer to a periodic time-bounded communication unit defined by a wireless communication standard or protocol. Additionally or alternatively, different configurations of wireless communication structures than those shown in FIG. 3A may be used.

In some telecommunications (for example, NR), a base station may transmit synchronization signals. For example, a base station may transmit a primary synchronization signal (PSS), a secondary synchronization signal (SSS), or the like, or combinations thereof, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, or the PBCH in accordance with a synchronization communication hierarchy (for example, a synchronization signal (SS) hierarchy) including multiple synchronization communications (for example, SS blocks), as described below in connection with FIG. 3B.

Figure 3B:
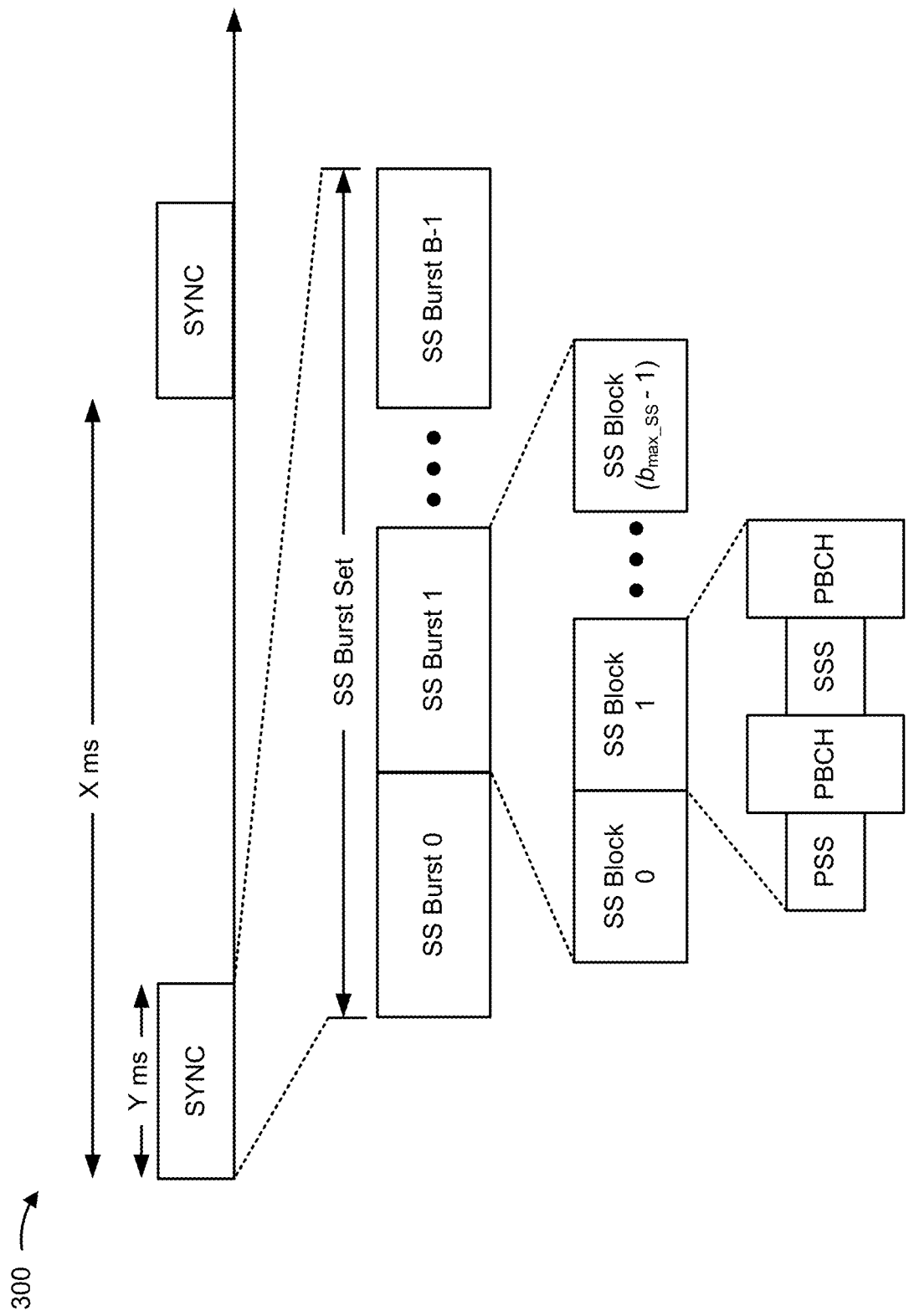
FIG. 3B is a block diagram illustrating an example synchronization communication hierarchy for use in a wireless communication network in accordance with various aspects of the present disclosure.

FIG. 3B is a block diagram illustrating an example synchronization communication hierarchy for use in a wireless communication network in accordance with various aspects of the present disclosure. The SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum quantity of repetitions of the SS burst that may be transmitted by the base station). As further shown, each SS burst may include one or more SS blocks (identified as SS block 0 through SS block ($b_{max\_ss-1}$), where $b_{max\_SS-1}$ is a maximum quantity of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, or other synchronization signals (for example, a tertiary synchronization signal (TSS)) or synchronization channels. In some aspects, multiple SS blocks are included in an SS burst, and the PSS, the SSS, or the PBCH may be the same across each SS block of the SS burst. In some aspects, a single SS block may be included in an SS burst. In some aspects, the SS block may be at least four symbol periods in length, where each symbol carries one or more of the PSS (for example, occupying one symbol), the SSS (for example, occupying one symbol), or the PBCH (for example, occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (for example, consecutive symbol periods) during one or more slots. Additionally or alternatively, one or more SS blocks of the SS burst may be transmitted in non-consecutive radio resources.

In some aspects, the SS bursts may have a burst period during which the SS blocks of the SS burst are transmitted by the base station in accordance with the burst period. In other words, the SS blocks may be repeated during each SS burst. In some aspects, the SS burst set may have a burst set periodicity, and the SS bursts of the SS burst set are transmitted by the base station in accordance with the fixed burst set periodicity. In other words, the SS bursts may be repeated during each SS burst set.

The base station may transmit system information, such as system information blocks (SIBs) on a physical downlink shared channel (PDSCH) in some slots. The base station may transmit control information/data on a physical downlink control channel (PDCCH) in C symbol periods of a slot, where C may be configurable for each slot. The base station may transmit traffic data or other data on the PDSCH in the remaining symbol periods of each slot.

Figure 4:
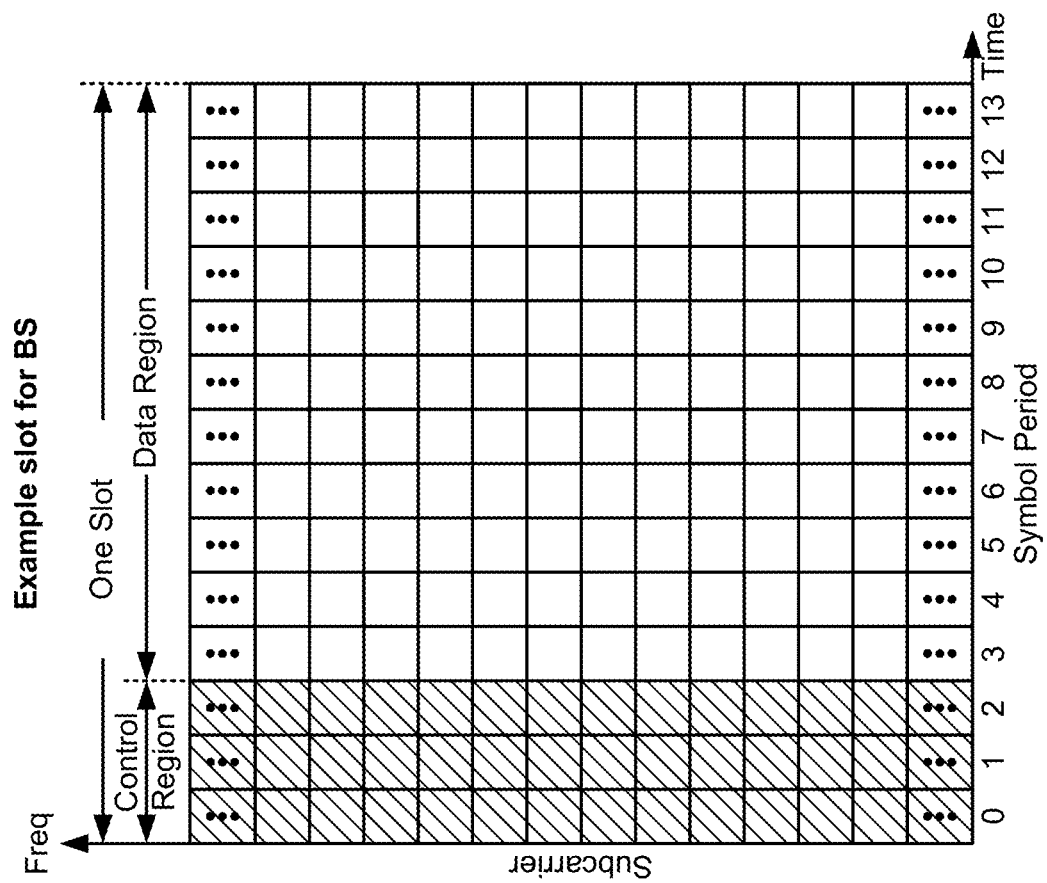
FIG. 4 is a block diagram illustrating an example slot format in accordance with various aspects of the present disclosure.

FIG. 4 is a block diagram 400 illustrating an example slot format 410 in accordance with various aspects of the present disclosure. The available time frequency resources may be partitioned into resource blocks. Each resource block may cover a set of subcarriers (for example, 12 subcarriers) in one slot and may include a quantity of resource elements. Each resource element may cover one subcarrier in one symbol period (for example, in time) and may be used to send one modulation symbol, which may be a real or complex value.

An interlace structure may be used for each of the downlink and uplink for FDD in some telecommunications systems (for example, NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, or the like, or combinations thereof. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate in accordance with a new air interface (for example, other than Orthogonal Frequency Divisional Multiple Access (OFDMA)-based air interfaces) or fixed transport layer (for example, other than Internet Protocol (IP)). In aspects, NR may utilize OFDM with a cyclic prefix (CP) (herein referred to as cyclic prefix OFDM or CP-OFDM) or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) or DFT-s-OFDM on the uplink, may utilize CP-OFDM on the downlink and include support for half-duplex operation using TDD. NR may include Enhanced Mobile Broadband (eMBB) service targeting wide bandwidth (for example, 80 megahertz (MHz) and beyond), millimeter wave (mmW) targeting high carrier frequency (for example, 60 gigahertz (GHz)), massive MTC (mMTC) targeting non-backward compatible MTC techniques, or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (for example, downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells. Alternatively, NR may support a different air interface, other than an OFDM-based interface. NR networks may include entities such as central units or distributed units.

Figure 5:
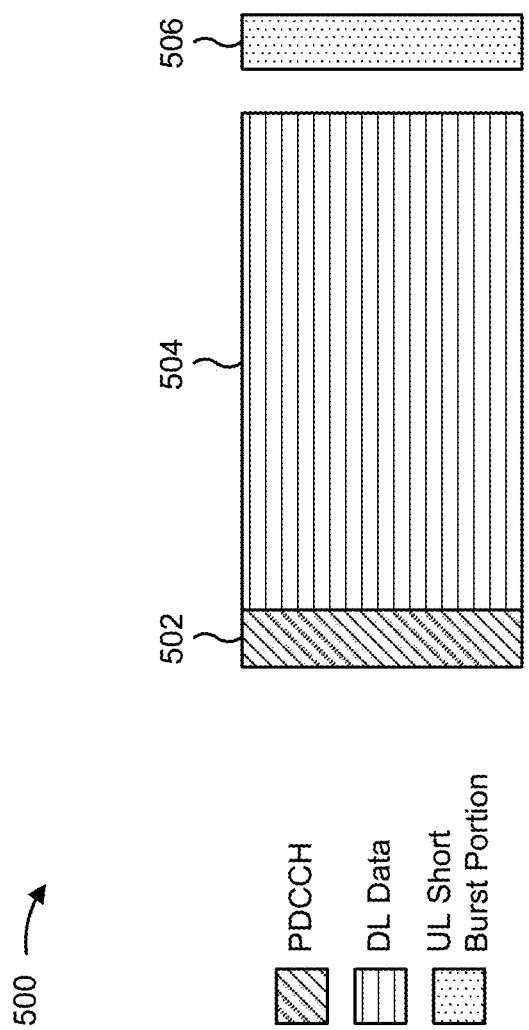
FIG. 5 is a diagram showing an example downlink (DL)-centric slot or communication structure in accordance with various aspects of the present disclosure.

FIG. 5 is a diagram showing an example downlink (DL)-centric slot 500 or communication structure in accordance with various aspects of the present disclosure. The DL-centric slot (or wireless communication structure) may include a control portion 502 during which the scheduling entity (for example, UE or BS) transmits various scheduling information or control information corresponding to various portions of the DL-centric slot to the subordinate entity (for example, UE). The control portion 502 may exist in the initial or beginning portion of the DL-centric slot. In some configurations, the control portion 502 may be a physical DL control channel PDCCH, as indicated in FIG. 5. In some aspects, the control portion 502 may include legacy PDCCH information, shortened PDCCH (sPDCCH) information), a control format indicator (CFI) value (for example, carried on a physical control format indicator channel (PCFICH)), one or more grants (for example, downlink grants, uplink grants, or the like, or combinations thereof), or the like, or combinations thereof.

The DL-centric slot may also include a DL data portion 504 during which the scheduling entity (for example, UE or BS) transmits DL data to the subordinate entity (for example, UE) using communication resources utilized to communicate DL data. The DL data portion 504 may sometimes be referred to as the payload of the DL-centric slot. In some configurations, the DL data portion 504 may be a PDSCH.

The DL-centric slot may also include an UL short burst portion 506 during which the subordinate entity (for example, UE) transmits reference signals or feedback to the scheduling entity (for example, UE or BS) using communication resources utilized to communicate UL data. The UL short burst portion 506 may sometimes be referred to as an UL burst, an UL burst portion, a common UL burst, a short burst, an UL short burst, a common UL short burst, a common UL short burst portion, or various other suitable terms. In some aspects, the UL short burst portion 506 may include one or more reference signals. Additionally or alternatively, the UL short burst portion 506 may include feedback information corresponding to various other portions of the DL-centric slot. For example, the UL short burst portion 506 may include feedback information corresponding to the control portion 502 or the data portion 504. Non-limiting examples of information that may be included in the UL short burst portion 506 include an acknowledgement (ACK) signal (for example, a physical uplink control channel (PUCCH) ACK, a physical uplink shared channel (PUSCH) ACK, or an immediate ACK), a negative acknowledgement (NACK) signal (for example, a PUCCH NACK, a PUSCH NACK, or an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, or various other suitable types of information. The UL short burst portion 506 may include additional or alternative information, such as information pertaining to RACH procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, or various other suitable terms. This separation provides time for the switch-over from DL communication (for example, reception operation by the subordinate entity (for example, BS or UE)) to UL communication (for example, transmission by the subordinate entity (for example, UE)). The foregoing provides some examples of a DL-centric wireless communication structure, but alternative structures having similar features may exist without deviating from the aspects described herein.

Figure 6:
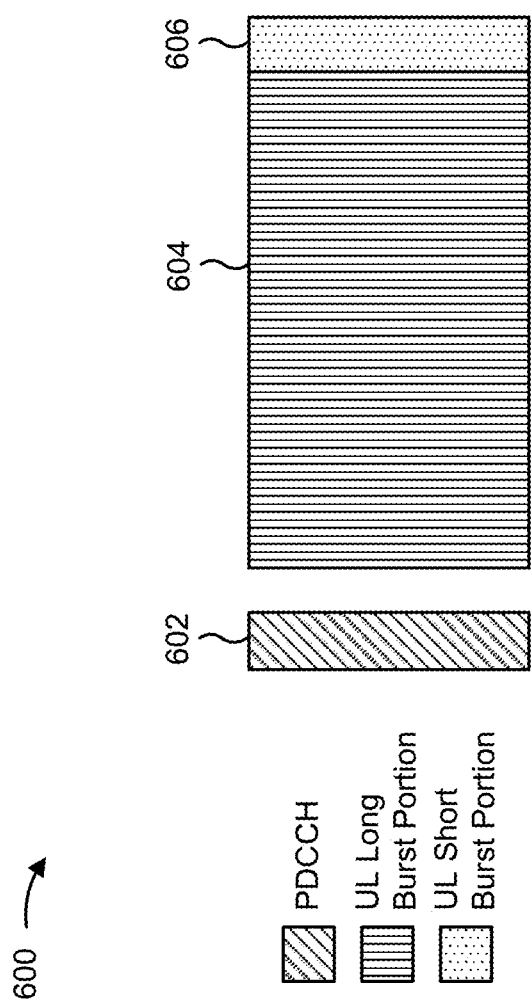
FIG. 6 is a diagram showing an example uplink (UL)-centric slot or communication structure in accordance with various aspects of the present disclosure.

FIG. 6 is a diagram showing an example uplink (UL)-centric slot 600 or communication structure in accordance with various aspects of the present disclosure. The UL-centric slot (or wireless communication structure) may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL long burst portion 604. The UL long burst portion 604 may sometimes be referred to as the payload of the UL-centric slot. The UL portion may refer to the communication resources utilized to communicate UL data from the subordinate entity (for example, UE) to the scheduling entity (for example, UE or BS). In some configurations, the control portion 602 may be a physical DL control channel PDCCH.

As illustrated in FIG. 6, the end of the control portion 602 may be separated in time from the beginning of the UL long burst portion 604. This time separation may sometimes be referred to as a gap, guard period, guard interval, or various other suitable terms. This separation provides time for the switch-over from DL communication (for example, reception operation by the scheduling entity) to UL communication (for example, transmission operation by the scheduling entity).

The UL-centric slot may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without deviating from the aspects described herein.

In some circumstances, two or more subordinate entities (for example, UEs) may communicate with each other using sidelink signals. Real-world applications of such sidelink communications may include public safety, proximity services, UE-to-network relaying, V2V communications, Internet of Everything (IoE) communications, IoT communications, mission-critical mesh, or various other suitable applications. Generally, a sidelink signal may refer to a signal communicated from one subordinate entity (for example, UE1) to another subordinate entity (for example, UE2) without relaying that communication through the scheduling entity (for example, UE or BS), even though the scheduling entity may be utilized for scheduling or control purposes. In some aspects, the sidelink signals may be communicated using a licensed spectrum band; in other aspects, the sidelink signals may be communicated using an unlicensed spectrum band.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

A cellular broadcast service may be used to allow one or more base stations to broadcast communications for receipt by any UEs in a geographical area (for example, one or more cells) covered by the broadcast (such that any UE located in the one or more cells can receive the broadcasted communications). An example of a cellular broadcast service is a television service. In order to extend and enhance outreach and capabilities of cellular broadcast services (beyond the outreach and capabilities of cellular broadcast services in a legacy network, such as an LTE network), various use cases should be considered. Such use cases include, for example, a cellular broadcast service that uses a network with relatively large ISDs between cells (for example, as compared to ISDs in a legacy LTE network), and a cellular broadcast service usable in a high mobility scenario (for example, when a given UE is located in a moving vehicle).

In order to support a cellular broadcast service in such scenarios, a design of new numerologies is needed (for example, in terms of OFDM subcarrier spacing, cyclic-prefix length, reference signal design, or the like). However, a challenge in such scenarios is to ensure that cell acquisition information—which informs a UE of details of the cellular broadcast scheme employed in the network—is received reliably by UEs.

Ensuring receipt of cell acquisition information is challenging because these new scenarios may mean a lower received SNR of channels in the CAS (as compared to scenarios considered in the design of cellular broadcast services for a legacy network). Further, ensuring receipt of cell acquisition information is challenging because, to be backward compatible with legacy UEs (for example, LTE UEs) supporting cellular broadcast services, a numerology and a periodicity of a cell acquisition subframe (CAS) cannot be changed. For example, in an LTE-based broadcast scenario, a CAS carries system information for broadcast (for example, OFDM subcarrier spacings employed in MBSFN subframes, cyclic prefix length, or the like), as well as the usual synchronization signals. In an LTE system, the CAS is one subframe long, has a periodicity of 40 milliseconds (ms), has legacy LTE numerology (in other words, 15 kHz OFDM subcarrier spacing), carries typical LTE channels (for example, a PDCCH, a PDSCH, a PBCH, a PCFICH, and a PHICH), and carries a set of synchronization signals (for example, PSS and SSS). Per LTE specifications, the PDCCH can at most be three symbols in duration (for typical broadcast bandwidths of 10 MHz and above). Notably, in the legacy PDCCH design, the largest size of a PDCCH candidate that a UE monitors in a common search space is eight CCEs—which maps to 72 REGs on the time-frequency grid in a specified pattern. A PDCCH candidate is a possible location for a PDCCH (in other words, a set of resources in which it is possible for the PDCCH to be communicated). A common search space is a set of resources comprising all of the PDCCH candidates associated with a group of UEs (in other words, a group of sets of resources in which it is possible for the PDCCH to be communicated to the group of UEs). A legacy UE can monitor a PDCCH candidate up to this size (in other words, an aggregation level of eight CCEs) and in this specified location. This CAS design cannot be changed, in order to ensure that a cellular broadcast service is backward compatible with legacy UEs.

Some aspects described herein provide CAS enhancements for cellular broadcast services. In some aspects, the CAS may be enhanced by defining an enhanced PDCCH candidate for monitoring by non-legacy UEs, where the enhanced CAS carries control information that is decodable by legacy UEs. In some aspects, the CAS may be enhanced by utilizing unused PHICH resources in the CAS (for example, to transmit an additional PCFICH, an additional PDCCH, an additional cell-specific reference signal, or the like). In some aspects, the CAS may be enhanced to carry other information associated with improving reception of the cell acquisition information. In some aspects, a MIB may be used to carry information associated with the enhanced CAS. Additional details regarding such CAS enhancements are described below.

FIGS. 7A-7D are diagrams illustrating examples associated with CAS enhancements for cellular broadcast services in accordance with various aspects of the present disclosure.

Figure 7A:
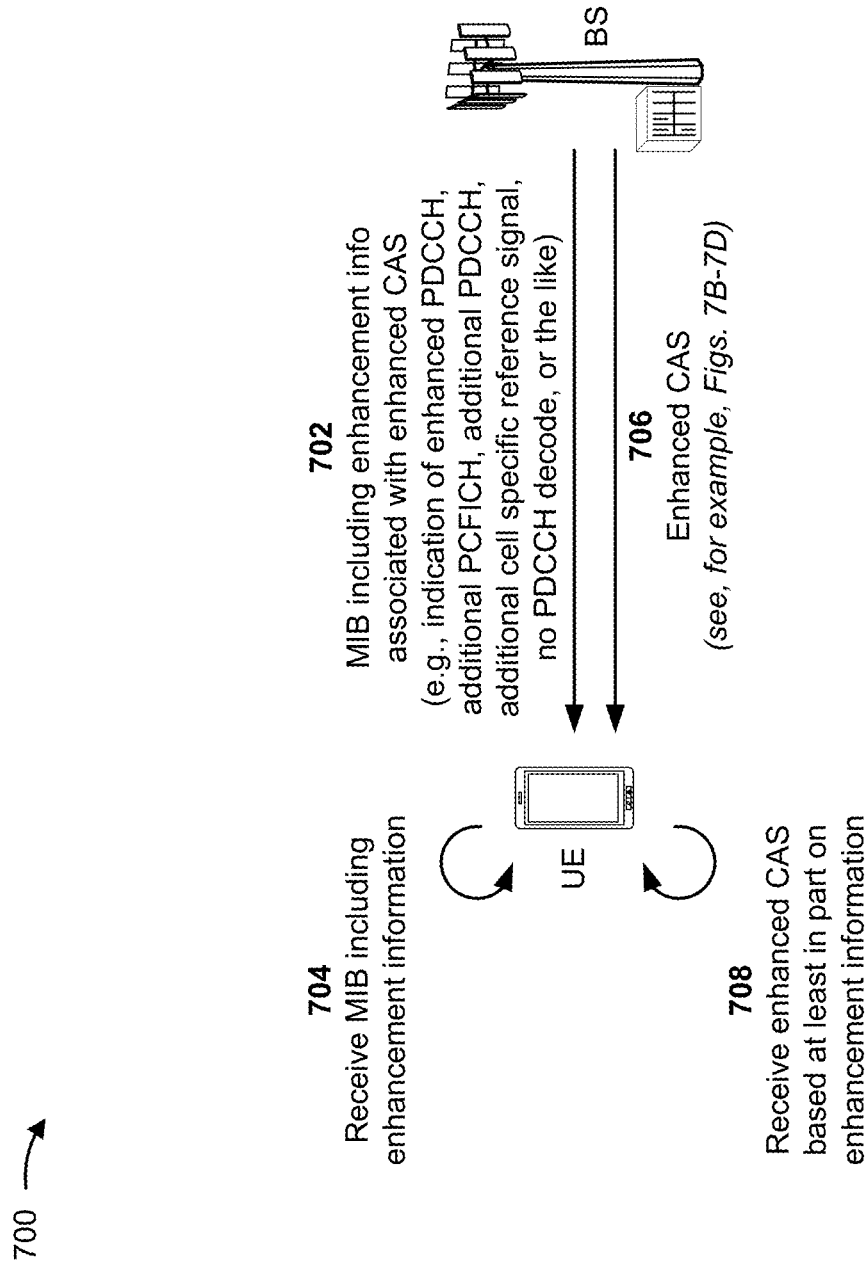

In example 700 of FIG. 7A, in a first operation 702, a base station (for example, base station 110) transmits a MIB including enhancement information associated with an enhanced CAS for a cellular broadcast service. In some aspects, the base station transmits the MIB in a PBCH to be received by one or more non-legacy UEs. In some aspects, the enhancement information may be included in one or more spare or unused bits in the MIB (in other words, one or more bits that a legacy UE is configured to ignore when receiving the MIB). The base station may transmit the MIB such that a legacy portion of the MIB (in other words, bits that are not ignored by the legacy UEs) is unaffected in order to allow legacy UEs to receive the MIB. A non-legacy UE is a UE configured to access the cellular broadcast service via a non-legacy network, such as a 5G cellular broadcast network (rather than accessing the cellular broadcast service via a legacy network).

An enhanced CAS, as described herein, is a CAS including information that improves reliability and coverage associated with receipt of the CAS by the non-legacy UE (in other words, to improve a likelihood that the non-legacy UE will successfully receive the CAS). The enhancement information, included in the MIB, is information describing enhancements present in the enhanced CAS. In some aspects, the enhancement information is used to indicate the enhancements present in the CAS (for example, in order to allow a non-legacy UE that receives the enhanced CAS to interpret information included in the CAS). In a second operation 704, a non-legacy UE (for example, a UE 120) receives the MIB including the enhancement information. Further operations of FIG. 7A are described below, followed by particular examples and operations associated with enhancement information and enhanced CASs.

In a third operation 706, the base station transmits the enhanced CAS, associated with the cellular broadcast service, based at least in part on the enhancement information associated with the enhanced CAS. In some aspects, the base station transmits the CAS in accordance with the enhancement information (such that the non-legacy UE can receive and interpret the enhanced CAS based at least in part on the enhancement information previously received by the UE). Illustrative examples of enhanced CASs are described below with regard to FIGS. 7B-7D.

In a fourth operation 708, the non-legacy UE receives the enhanced CAS, associated with the cellular broadcast service, based at least in part on the enhancement information associated with the enhanced CAS. For example, the non-legacy UE may receive the enhanced CAS and interpret information included in the CAS in accordance with the enhancement information.

In some aspects, the enhancement to the CAS may include an enhancement associated with a PDCCH. For example, in some aspects, the enhancement information may include an indication that the non-legacy UE is to monitor an enhanced PDCCH candidate in a common search space of the enhanced CAS. The enhanced PDCCH candidate is a PDCCH candidate having an aggregation level greater than a legacy maximum aggregation level (for example, greater than a legacy maximum aggregation level of eight). For example, the enhanced PDCCH candidate may have an aggregation level greater than eight, such as 16, 24, or the like. In some aspects, the enhanced PDCCH candidate may have an aggregation level up to 24 (in other words, less than or equal to 24). In some aspects, the enhanced PDCCH candidate may have at least one time-frequency resource in common with a legacy PDCCH candidate in the common search space of the enhanced CAS (such that the enhanced PDCCH candidate at least partially overlaps the legacy PDCCH candidate).

In some aspects, when the enhancement information includes an indication that the non-legacy UE is to monitor an enhanced PDCCH candidate, the base station may generate the PDCCH to be transmitted in resources of the enhanced PDCCH candidate in the common search space of the enhanced CAS associated with the cellular broadcast service, and may transmit the PDCCH in the resources of the enhanced PDCCH candidate in the common search space of the CAS associated with the cellular broadcast service. Here, when receiving the enhanced CAS, the non-legacy UE may monitor the enhanced PDCCH candidate in association with receiving the PDCCH included in the common search space of the CAS and, as a result, may receive the PDCCH in resources of the common search space based at least in part on monitoring the enhanced PDCCH candidate. In some aspects, the enhanced PDCCH candidate may be within three or fewer PDCCH symbols in the enhanced CAS.

In some aspects, control information included in the PDCCH (for example, DCI), is decodable by a legacy UE configured to monitor a legacy PDCCH candidate in the common search space of the enhanced CAS. For example, when generating the PDCCH, the base station may map a first encoded bit stream, associated with control information included in the PDCCH, to a first set of resources, and may map a second encoded bit stream, associated with the control information included in the PDCCH, to a second set of resources. In other words, the base station may map a first bit stream comprising the control information to a first legacy set of resources, and may map a second bit stream comprising the control information (the same control information) to a second set of resources. Here, the first set of resources is included in both the enhanced PDCCH candidate and the legacy PDCCH candidate, and the second set of resources is included in the enhanced PDCCH candidate only. A legacy UE may receive the control information in the first set of resources based at least in part on monitoring the legacy PDCCH candidate, while the non-legacy UE may receive the control information in the first and/or the second set of resources based at least in part on monitoring the enhanced PDCCH candidate. Thus, the non-legacy UE may see a lower code rate and, therefore, experience better reliability as compared to the legacy UE. Notably, in this example, the encoding and mapping for the legacy portion is not altered, but a separate encoded stream (corresponding to the same information) is mapped in additional time-frequency locations.

As another example, when generating the PDCCH, the base station may map a single encoded bit stream, associated with the control information, to resources associated with the legacy PDCCH candidate and the enhanced PDCCH candidate. Here, the base station may generate the PDCCH such that the control information is decodable from a first portion of the single encoded bit stream based at least in part on monitoring the legacy PDCCH candidate, and such that the control information is decodable from the first portion of the single encoded bit stream and a second portion of the single encoded bit stream based at least in part on monitoring the enhanced PDCCH candidate. In such a case, the control information may be decodable from the first portion of the single encoded bit stream (for example, such that the legacy UE can decode the control information from only the first portion of the single encoded bit stream), while the second portion of the single encoded bit stream provides, to the non-legacy UE, reliability and enhanced coverage associated with decoding the control information. In some aspects, the second portion of the single encoded bit stream is scrambled/descrambled or rotated based at least in part on a characteristic associated with the enhanced CAS, such as a frame number associated with the CAS. In some aspects, performing such operations based at least in part on the characteristic may facilitate cross-subframe combining of PDCCHs, as described below.

An example using this process for generating the PDDCH is provided below. In a first operation, an aggregation level (for example, L=16, 24) for the new PDCCH candidate is defined. In a next operation, an encoder output from an encoder (for example, a tail-biting convolutional coder (TBCC) encoder) may be rate matched to a length corresponding to L×9×4×2=72×L bits. Here, an order and position of the first 72×8 bits (in other words, the bits corresponding to the legacy PDCCH candidate comprising 8 CCEs) are unchanged. In a next operation, an independent bit-level operation (for example, scrambling) may be performed on the other {72×8+1 to 72×L} bits (in other words, the non-legacy bits). In some aspects, this bit-level operation may be performed based at least in part on a frame number (for example, to facilitate cross-subframe combining). In some aspects, the bit stream is then scrambled by a cell identifier specific sequence as described for example in TS 36.211 Section 6.8.2. In a next operation, the bit stream (comprising legacy bits in unchanged positions, and additional bits from the rate-matching output, together with <NIL> elements) may be mapped for example per procedures in TS 36.211 Section 6.8.3 onwards. Here, the mapping operation as described in TS 36.211 Section 6.8.5 may ensure that the position of the modulated legacy bits in the time-frequency grid are unchanged, while the additional bits may will be mapped to REGs that were otherwise mapping <NIL> elements.

FIG. 7B is a diagram of an example of enhanced CAS including a PDCCH enhancement. In FIG. 7B, the PDCCH REGs labeled "PDCCH L" correspond to bits generated in a manner that matches legacy, while the PDCCH REGs labeled "PDCCH E" correspond to bits generated beyond the legacy bit stream. In this example, the legacy PDCCH candidate corresponds to the PDCCH REGs labeled as "PDCCH L", while the enhanced PDCCH candidate corresponds to the combination of the PDCCH REGs labeled as "PDCCH L" and the PDCCH REGs labeled as "PDCCH E".

In some aspects, the non-legacy UE may combine the PDCCH, received based at least in part on monitoring the enhanced PDCCH candidate, with another PDCCH included in a common search space of another CAS. For example, the enhancement information may include an indication that the non-legacy UE is to combine the PDCCH, to be received in the common search space of the CAS, with another PDCCH (for example, a PDCCH received in a common search space of a previously received CAS, a PDCCH to be received in a common search space of a CAS to be received at a later time, or the like). Here, the non-legacy UE may receive the PDCCH, and may combine the PDCCH with the other PDCCH, accordingly. In this way, cross-subframe combining of PDCCHs may be achieved. In some aspects, an operation performed on a bit stream associated with the control information may be performed based at least in part on a characteristic of the enhanced CAS in order to facilitate cross-subframe combining (such that the non-legacy UE may identify a manner or order in which the PDCCHs are to be combined).

In some aspects, because the mode of operation is downlink-only for broadcast, PHICH resources may be unutilized. Thus, in some aspects, the enhancement information may include an indication to receive an additional PCFICH (in other words, information that identifies a number of control symbols in the enhanced CAS) in at least one symbol of a set of resources associated with the PHICH. Here, when transmitting the enhanced CAS, the base station may transmit the additional PCFICH (the same PCFICH that is transmitted in a set of symbols typically used to transmit the PCFICH) in the at least one symbol of the set of resources associated with the PHICH. The non-legacy UE, when receiving the enhanced CAS, may receive the additional PCFICH in the at least one symbol of the set of resources associated with the PHICH based at least in part on the enhancement information. In this way, the enhanced CAS may be used to improve coverage of the PCFICH.

Figure 7C:
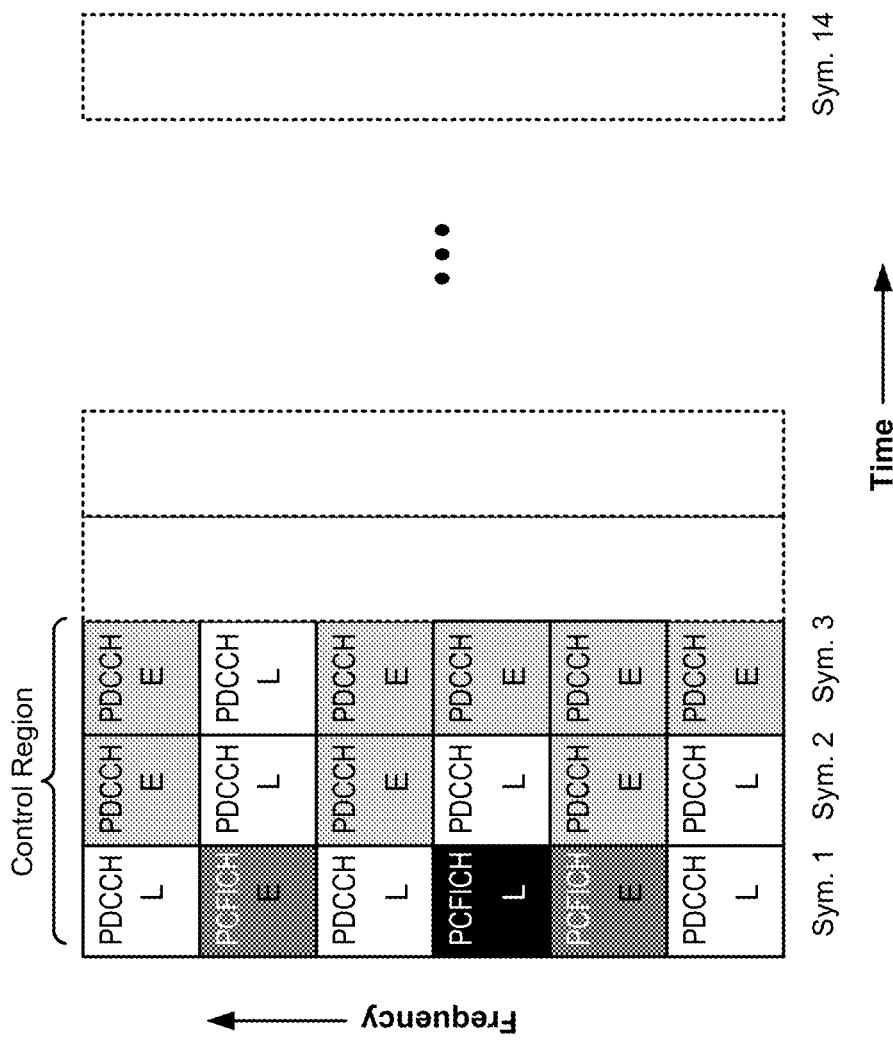

FIG. 7C is a diagram of an example of enhanced CAS including such an additional PCFICH. In FIG. 7C, the legacy PDCCH candidate corresponds to the PDCCH REGs labeled as "PDCCH L" and the enhanced PDCCH candidate corresponds to the combination of the PDCCH REGs labeled as "PDCCH L" and the PDCCH REGs labeled as "PDCCH E", as described above in association with FIG. 7B. As further shown in FIG. 7C, a PCFICH may be carried in a REG labeled as "PCFICH L," and an additional PCFICH may be carried in previously unused PHICH resources, which are labeled as "PCFICH E" in FIG. 7C.

In some aspects, as noted above, because the mode of operation is downlink-only for broadcast, PHICH resources may be unutilized. In some aspects, the enhancement information may include an indication to receive an additional PDCCH in at least one symbol of the set of resources associated with the PHICH. Here, when transmitting the enhanced CAS, the base station may transmit the additional PDCCH (for example, a separate PDCCH bit stream that is mapped to the PHICH resources) in the at least one symbol of the set of resources associated with the PHICH. The non-legacy UE, when receiving the enhanced CAS, may receive the additional PDCCH in the at least one symbol of the set of resources associated with the PHICH based at least in part on the enhancement information. In this way, the enhanced CAS may be used to further improve coverage of the PDCCH.

Figure 7D:
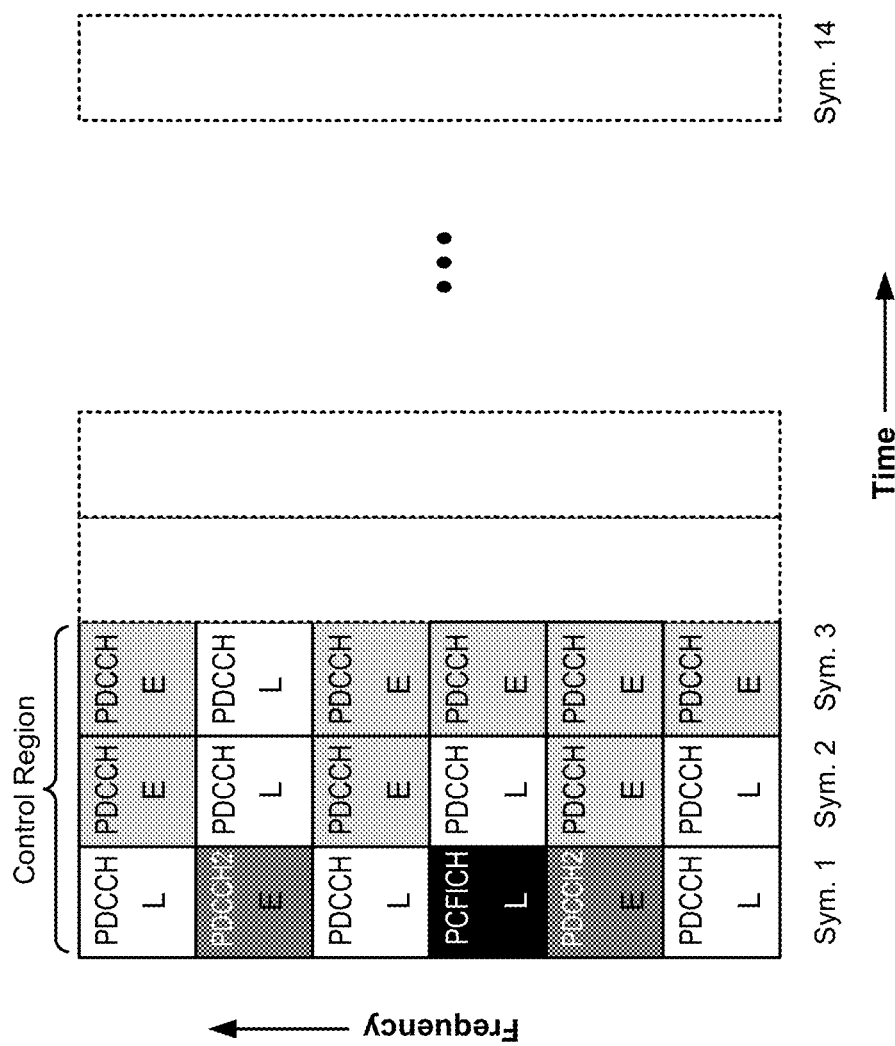

FIG. 7D is a diagram of an example of enhanced CAS including such an additional PDCCH. In FIG. 7D, the legacy PDCCH candidate corresponds to the PDCCH REGs labeled as "PDCCH L" and the enhanced PDCCH candidate corresponds to the combination of the PDCCH REGs labeled as "PDCCH L" and the PDCCH REGs labeled as "PDCCH E", as described above in association with FIG. 7B. As further shown in FIG. 7D, an additional PDCCH (identified as PDCCH2) may be carried in previously unused PHICH resources, which are labeled as "PDCCH2 E" in FIG. 7D.

In some aspects, the enhancement information includes information that identifies a number of symbols associated with the PDCCH. In this way, backup to the PCFICH may be provided.

In some aspects, as noted above, because the mode of operation is downlink-only for broadcast, PHICH resources may be unutilized. In some aspects, the enhancement information may include an indication to receive an additional cell-specific reference signal (CRS) in at least one symbol of the set of resources associated with the PHICH. Here, when transmitting the enhanced CAS, the base station may transmit the additional CRS (for example, the same CRS that is transmitted in a set of symbols typically used to transmit the CRS) in the at least one symbol of the set of resources associated with the PHICH. The non-legacy UE, when receiving the enhanced CAS, may receive the additional CRS in the at least one symbol of the set of resources associated with the PHICH based at least in part on the enhancement information. In this way, the enhanced CAS may be used to further improve channel estimation. In some aspects, the additional cell-specific reference signal is scrambled/descrambled based at least in part on a cell identifier or a frame number. In some aspects, at least one symbol in which the additional cell-specific reference signal is communicated is dependent on a cell identifier.

In some scenarios, there may be only one CRS port configured by the base station. Here, REGs may not map any information to REs that corresponding to a second CRS port, even though no CRS is transmitted in the REs corresponding to the second CRS port. A legacy UE makes no assumption about contents of the REs corresponding to the second CRS port when only one CRS port is configured by the base station (in other words, the legacy UE ignores the REs corresponding to the second CRS port). In such a scenario, with an appropriate MIB indication to a non-legacy UE, an additional cell-specific reference signal can be transmitted in the (otherwise empty) REs corresponding to the second CRS port. Thus, the REs corresponding to the second CRS port may be used for transmission of an additional CRS that can be used to improve channel estimation. Thus, in some aspects, the enhancement information may include an indication to receive an additional CRS in one or more resources corresponding to a CRS port that is configured on the UE. Here, when receiving the enhanced CAS comprises, the UE may receive the additional cell-specific reference signal in the one or more resources corresponding to the CRS port. In some aspects, the additional CRS may be scrambled/descrambled based at least in part on at least one of a cell identifier, an OFDM symbol number, a frame number, or the like.

In some aspects, the enhancement information may include information that identifies a quantity of blind decoding attempts that the non-legacy UE is to perform in association with receiving the PDCCH in the common search space of the enhanced CAS. The quantity of blind decoding attempts may be different from legacy because the enhanced PDCCH candidate is larger in size than the legacy PDCCH candidate, thereby consuming additional UE resources to decode. In some aspects, the enhancement information may include an indication that the non-legacy UE is not to monitor at least one legacy PDCCH candidate in a common search space of the enhanced CAS (for example, in order to conserve resources of the non-legacy UE). In some aspects, the enhancement information may include an indication that the UE is to perform a single decoding attempt (in other words, no blind decoding) in a common search space of the enhanced CAS.

In some aspects, the enhancement information includes an indication of whether a particular CAS enhancement is active in the enhanced CAS. For example, the enhancement information may include information explicitly indicating whether one or more of the above described CAS enhancements are active (for example, cross-subframe combining, enhanced PDCCH candidate, or the like). As another example, the enhancement information may include information implicitly indicating whether one or more of the CAS enhancements are active. As a particular example, when the enhancement information includes information that identifies a quantity of blind decoding attempts that the non-legacy UE is to perform in association with receiving the PDCCH in the common search space of the enhanced CAS, this information may serve as an indication that the one or more other CAS enhancements are active.

In some aspects, the enhancement information may include an indication that the non-legacy UE is to skip decoding of a PDCCH. This may be the case when, for example, system and control information are mapped to a PDSCH (rather than a PDCCH). In some aspects, skipping the decoding of the PDCCH reduces decoding complexity and improves reliability for the non-legacy UE. In some aspects, the indication to skip the decoding of the PDCCH may include information that identifies a start symbol of a physical downlink shared channel (PDSCH). In some aspects, the indication to skip the decoding of the PDCCH may include other information, such as information that identifies a number of control symbols associated with skipping the decoding of the PDCCH, a transport block size of a system information block associated with skipping the decoding of the PDCCH, a resource allocation of the system information block associated with skipping the decoding of the PDCCH, a subframe associated with skipping the decoding of the PDCCH, or the like.

Figure 8:
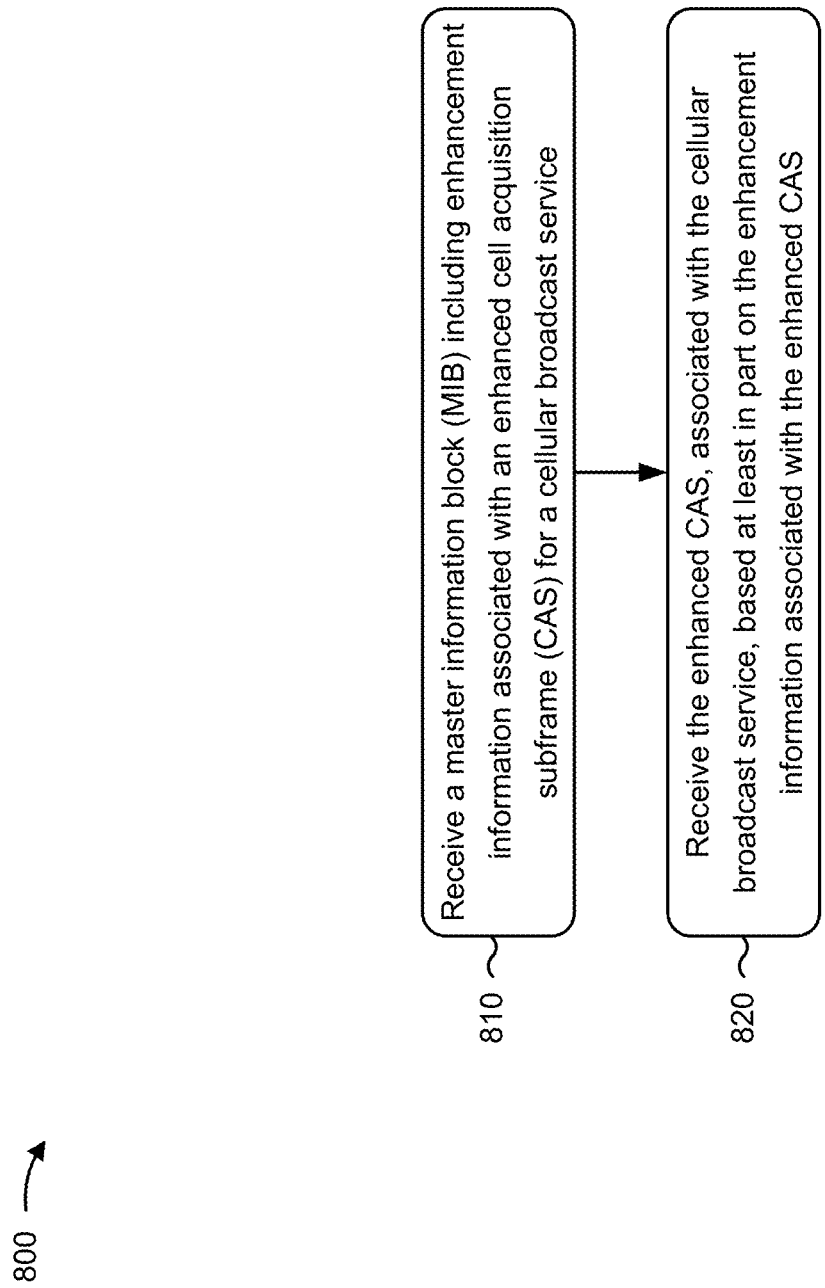
FIG. 8 is a diagram illustrating an example process performed by a UE in accordance with various aspects of the present disclosure.

FIG. 8 is a diagram illustrating an example process 800 performed, for example, by a UE, in accordance with various aspects of the present disclosure. Example process 800 is an example where a UE (for example, UE 120 or the like) performs operations associated with cell acquisition subframe enhancements.

As shown in FIG. 8, in some aspects, process 800 may include receiving a MIB including enhancement information associated with an enhanced CAS for a cellular broadcast service (block 810). For example, the UE (for example, using receive processor 258, controller/processor 280, memory 282, or the like) may receive a MIB including enhancement information associated with an enhanced CAS for a cellular broadcast service, as described above.

As further shown in FIG. 8, in some aspects, process 800 may include receiving the enhanced CAS, associated with the cellular broadcast service, based at least in part on the enhancement information associated with the enhanced CAS (block 820). For example, the UE (for example, using receive processor 258, controller/processor 280, memory 282, or the like) may receive the enhanced CAS, associated with the cellular broadcast service, based at least in part on the enhancement information associated with the enhanced CAS, as described above.

Process 800 may include additional aspects, such as any single implementation or any combination of aspects described below or in connection with one or more other processes described elsewhere herein.

In a first aspect, the enhancement information includes an indication that the UE is to monitor an enhanced PDCCH candidate in a common search space of the enhanced CAS. Here, receiving the enhanced CAS may include monitoring the enhanced PDCCH candidate in association with receiving a PDCCH included in the common search space of the CAS service (the enhanced PDCCH candidate having an aggregation level greater than a legacy maximum aggregation level, and having at least one resource in common with a legacy PDCCH candidate in the common search space of the enhanced CAS), and receiving the PDCCH in resources of the common search space based at least in part on monitoring the enhanced PDCCH candidate. That is, when the enhancement information includes an indication that the UE is to monitor an enhanced PDCCH candidate in a common search space of the enhanced CAS, in some examples, receiving the enhanced CAS includes monitoring the enhanced PDCCH candidate in association with receiving a PDCCH included in the common search space of the CAS service, and receiving the PDCCH in resources of the common search space based at least in part on monitoring the enhanced PDCCH candidate.

In a second aspect, in combination with the first aspect, the enhanced PDCCH candidate is within three or fewer PDCCH symbols in the enhanced CAS.

In a third aspect, in combination with any one or more of the first and second aspects, the legacy maximum aggregation level is eight.

In a fourth aspect, in combination with any one or more of the first through third aspects, control information, included in the PDCCH, is decodable by a legacy UE configured to monitor the legacy PDCCH candidate in the common search space of the enhanced CAS.

In a fifth aspect, in combination with any one or more of the first through fourth aspects, control information, included in the PDCCH, comprises a first encoded bit stream mapped to a first set of resources and a second encoded bit stream mapped to a second set of resources. Here, the first set of resources is included in both the enhanced PDCCH candidate and the legacy PDCCH candidate, and the second set of resources is included in the enhanced PDCCH candidate only.

In a sixth aspect, in combination with any one or more of the first through fourth aspects, control information, included in the PDCCH, comprises a single encoded bit stream. Here, the control information is decodable from a first portion of the single encoded bit stream based at least in part on monitoring the legacy PDCCH candidate, and the control information is decodable from the first portion of the single encoded bit stream and a second portion of the single encoded bit stream based at least in part on monitoring the enhanced PDCCH candidate.

In a seventh aspect, in combination with the sixth aspect, the control information is decodable from the first portion of the single encoded bit stream, while the second portion of the single encoded bit stream provides reliability and enhanced coverage associated with decoding the control information.

In an eighth aspect, in combination with any one or more of the sixth and seventh aspects, the second portion of the single encoded bit stream is descrambled or rotated based at least in part on a characteristic associated with the enhanced CAS.

In a ninth aspect, in combination with any one or more of the first through eighth aspects, the UE may combine the PDCCH with another PDCCH included in a common search space of another CAS. That is, in some examples, the process 800 may include combining the PDCCH with another PDCCH included in a common search space of another CAS based at least in part on an indication included in the MIB.

In a tenth aspect, in combination with the ninth aspect, the PDCCH is combined with the other PDCCH based at least in part on an indication included in the MIB.

In an eleventh aspect, in combination with any one or more of the first through tenth aspects, the enhanced PDCCH candidate has an aggregation level of 16.

In a twelfth aspect, in combination with any one or more of the first through eleventh aspects, the enhanced PDCCH candidate has an aggregation level that is less than or equal to 24.

In a thirteenth aspect, alone or in combination with any one or more of the first through twelfth aspects, the enhancement information includes an indication to receive an additional PCFICH in at least one symbol of a set of resources associated with a PHICH. Here, receiving the enhanced CAS may include receiving the additional PCFICH in the at least one symbol of the set of resources associated with the PHICH.

In a fourteenth aspect, alone or in combination with any one or more of the first through thirteenth aspects, the enhancement information includes an indication to receive an additional PDCCH in at least one symbol of a set of resources associated with a PHICH. Here, receiving the enhanced CAS may include receiving the additional PDCCH in the at least one symbol of the set of resources associated with the PHICH.

In a fifteenth aspect, alone or in combination with any one or more of the first through fourteenth aspects, the enhancement information includes information that identifies a number of symbols associated with a PDCCH.

In a sixteenth aspect, alone or in combination with any one or more of the first through fifteenth aspects, the enhancement information includes information that identifies a quantity of blind decoding attempts that the UE is to perform in association with receiving a PDCCH in a common search space of the enhanced CAS.

In a seventeenth aspect, alone or in combination with any one or more of the first through sixteenth aspects, the enhancement information includes an indication that the UE is not to monitor at least one legacy PDCCH candidate in a common search space of the enhanced CAS.

In an eighteenth aspect, alone or in combination with any one or more of the first through seventeenth aspects, the enhancement information includes an indication that the UE is to perform a single decoding attempt in a common search space of the enhanced CAS.

In a nineteenth aspect, alone or in combination with any one or more of the first through eighteenth aspects, the enhancement information includes an indication of whether a particular CAS enhancement is active in the enhanced CAS.

In a twentieth aspect, the enhancement information includes an indication that the UE is to skip decoding of a PDCCH.

In a twenty-first aspect, in combination with the twentieth aspect, the indication includes information that identifies a start symbol of a PDSCH.

In a twenty-second aspect, in combination with any one or more of the twentieth and twenty-first aspects, the indication includes information that identifies at least one of a number of control symbols associated with skipping the decoding of the PDCCH, a transport block size of a system information block associated with skipping the decoding of the PDCCH, a resource allocation of the system information block associated with skipping the decoding of the PDCCH, or a subframe associated with skipping the decoding of the PDCCH.

In a twenty-third aspect, alone or in combination with any one or more of the first through twenty-second aspects, the enhancement information includes an indication to receive an additional CRS in at least one symbol of a set of resources associated with a PHICH. Here, when receiving the enhanced CAS, the UE may receive the additional cell-specific reference signal in the at least one symbol of the set of resources associated with the PHICH.

In a twenty-fourth aspect, in combination with the twenty-third aspect, the additional cell-specific reference signal is descrambled based at least in part on a cell identifier or a frame number.

In a twenty-fifth aspect, in combination with any one or more of the twenty-third aspect and twenty-fourth aspects, the at least one symbol in which the additional cell-specific reference signal is received is dependent on a cell identifier.

In a twenty-sixth aspect, alone or in combination with any one or more of the first through twenty-fifth aspects, the enhancement information includes an indication to receive an additional CRS in one or more resources corresponding to a CRS port that is to be ignored by legacy UEs. Here, when receiving the enhanced CAS, the UE may receive the additional cell-specific reference signal in the one or more resources corresponding to the CRS port.

In a twenty-seventh aspect, in combination with the twenty-sixth aspect, the additional CRS is scrambled based at least in part on at least one of a cell identifier, a symbol number, or a frame number.

Figure 9:
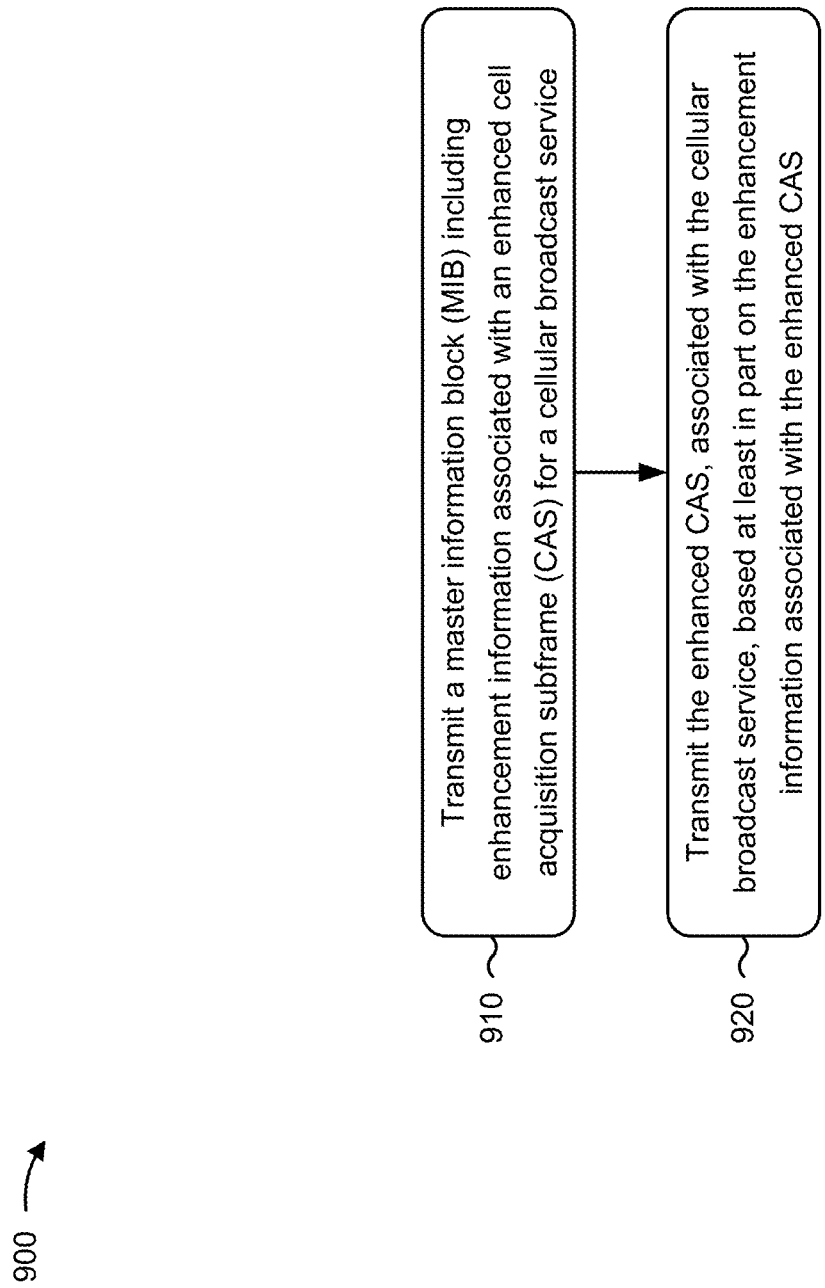
FIG. 9 is a diagram illustrating an example process performed by a base station in accordance with various aspects of the present disclosure.

FIG. 9 is a diagram illustrating an example process 900 performed, for example, by a base station, in accordance with various aspects of the present disclosure. Example process 900 is an example where a base station (for example, base station 110 and/or the like) performs operations associated with cell acquisition subframe enhancements.

As shown in FIG. 9, in some aspects, process 900 may include transmitting a MIB including enhancement information associated with an enhanced CAS for a cellular broadcast service (block 910). For example, the base station (for example, using transmit processor 220, controller/processor 240, memory 242, and/or the like) may transmit a MIB including enhancement information associated with an enhanced CAS for a cellular broadcast service, as described above.

As further shown in FIG. 9, in some aspects, process 900 may include transmitting the enhanced CAS, associated with the cellular broadcast service, based at least in part on the enhancement information associated with the enhanced CAS (block 920). For example, the base station (for example, using transmit processor 220, controller/processor 240, memory 242, and/or the like) may transmit the enhanced CAS, associated with the cellular broadcast service, based at least in part on the enhancement information associated with the enhanced CAS, as described above.

Process 900 may include additional aspects, such as any single implementation or any combination of aspects described below and/or in connection with one or more other processes described elsewhere herein.

In a first aspect, the enhancement information includes an indication that a UE (for example, UE 120) is to monitor an enhanced PDCCH candidate in a common search space of the enhanced CAS. Here, transmitting the enhanced CAS may include generating the PDCCH to be transmitted in resources of the enhanced PDCCH candidate in the common search space of the enhanced CAS associated with the cellular broadcast service (the enhanced PDCCH candidate having an aggregation level greater than a legacy maximum aggregation level, and having at least one resource in common with a legacy PDCCH candidate in the common search space of the enhanced CAS), and transmitting the PDCCH in the resources of the enhanced PDCCH candidate in the common search space of the CAS associated with the cellular broadcast service. That is, when the enhancement information includes an indication that a UE is to monitor an enhanced PDCCH candidate in a common search space of the enhanced CAS, in some examples, transmitting the enhanced CAS includes generating the PDCCH to be transmitted in resources of the enhanced PDCCH candidate in the common search space of the enhanced CAS associated with the cellular broadcast service, and transmitting the PDCCH in the resources of the enhanced PDCCH candidate in the common search space of the enhanced CAS associated with the cellular broadcast service.

In a second aspect, in combination with the first aspect, the enhanced PDCCH candidate is within three or fewer PDCCH symbols in the enhanced CAS.

In a third aspect, in combination with any one or more of the first and second aspects, the legacy maximum aggregation level is eight.

In a fourth aspect, in combination with any one or more of the first through third aspects, the base station may encode control information, included in the PDCCH, such that the control information is decodable by a legacy user equipment configured to monitor the legacy PDCCH candidate in the common search space of the enhanced CAS. That is, in some examples, the process 900 includes encoding control information, included in the PDCCH, such that the control information is decodable by a legacy UE configured to monitor the legacy PDCCH candidate in the common search space of the enhanced CAS.

In a fifth aspect, in combination with any one or more of the first through fourth aspects, the base station may map a first encoded bit stream, associated with control information included in the PDCCH, to a first set of resources, and map a second encoded bit stream, associated with the control information included in the PDCCH, to a second set of resources. Here, the first set of resources is included in both the enhanced PDCCH candidate and the legacy PDCCH candidate, and the second set of resources is included in the enhanced PDCCH candidate only.

In a sixth aspect, in combination with any one or more of the first through fourth aspects, control information, included in the PDCCH, comprises a single encoded bit stream. Here, the control information is decodable from a first portion of the single encoded bit stream based at least in part on monitoring the legacy PDCCH candidate, and the control information is decodable from the first portion of the single encoded bit stream and a second portion of the single encoded bit stream based at least in part on monitoring the enhanced PDCCH candidate.

In a seventh aspect, in combination with the sixth aspect, the control information is decodable from the first portion of the single encoded bit stream, while the second portion of the single encoded bit stream provides reliability and enhanced coverage associated with decoding the control information.

In an eighth aspect, in combination with any one or more of the sixth and seventh aspects, the second portion of the single encoded bit stream is descrambled or rotated based at least in part on a characteristic associated with the enhanced CAS.

In a ninth aspect, in combination with any one or more of the first through eighth aspects, the enhancement information includes an indication that a UE is to combine the PDCCH with another PDCCH included in a common search space of another CAS.

In a tenth aspect, in combination with any one or more of the first through ninth aspects, the enhanced PDCCH candidate has an aggregation level of 16.

In an eleventh aspect, in combination with any one or more of the first through tenth aspects, the enhanced PDCCH candidate has an aggregation level that is less than or equal to 24.

In a twelfth aspect, alone or in combination with any one or more of the first through eleventh aspects, the enhancement information includes an indication that a UE is to receive an additional PCFICH in at least one symbol of a set of resources associated with a PHICH.

In a thirteenth aspect, in combination with the twelfth aspect, transmitting the enhanced CAS includes transmitting the additional PCFICH in the at least one symbol of the set of resources associated with the PHICH.

In a fourteenth aspect, alone or in combination with any one or more of the first through thirteenth aspects, the enhancement information includes an indication that a UE is to receive an additional PDCCH in at least one symbol of a set of resources associated with a PHICH.

In a fifteenth aspect, in combination with the fourteenth aspect, transmitting the enhanced CAS includes transmitting the additional PDCCH in the at least one symbol of the set of resources associated with the PHICH.

In a sixteenth aspect, alone or in combination with any one or more of the first through fifteenth aspects, the enhancement information includes information that identifies a number of symbols associated with a PDCCH.

In a seventeenth aspect, alone or in combination with any one or more of the first through sixteenth aspects, the enhancement information includes information that identifies a quantity of blind decoding attempts that a UE is to perform in association with receiving a PDCCH in a common search space of the enhanced CAS.

In an eighteenth aspect, alone or in combination with any one or more of the first through seventeenth aspects, the enhancement information includes an indication that a UE is not to monitor at least one legacy PDCCH candidate in a common search space of the enhanced CAS.

In a nineteenth aspect, alone or in combination with any one or more of the first through eighteenth aspects, the enhancement information includes an indication that a UE is to perform a single decoding attempt in a common search space of the enhanced CAS.

In a twentieth aspect, alone or in combination with any one or more of the first through nineteenth aspects, the enhancement information includes an indication of whether a particular CAS enhancement is active in the enhanced CAS.

In a twenty-first aspect, the enhancement information includes an indication that a UE is to skip decoding of a PDCCH.

In a twenty-second aspect, in combination with the twenty-first aspect, the indication includes information that identifies a start symbol of a PDSCH.

In a twenty-third aspect, in combination with any one or more of the twenty-first and twenty-second aspects, the indication includes information that identifies at least one of a number of control symbols associated with skipping the decoding of the PDCCH, a transport block size of a system information block associated with skipping the decoding of the PDCCH, a resource allocation associated with skipping the decoding of the PDCCH, or a subframe associated with skipping the decoding of the PDCCH.

In a twenty-fourth aspect, alone or in combination with any one or more of the first through twenty-third aspects, the enhancement information includes an indication that a UE is to receive an additional CRS in at least one symbol of a set of resources associated with a PHICH.

In a twenty-fifth aspect, in combination with the twenty-fourth aspect, the additional CRS is descrambled based at least in part on a cell identifier or a frame number.

In a twenty-sixth aspect, in combination with any one or more of the twenty-fourth and twenty-fifth aspects, the at least one symbol in which the additional CRS is received is dependent on a cell identifier.

In a twenty-seventh aspect, alone or in combination with any one or more of the first through twenty-sixth aspects, the enhancement information includes an indication that a UE is to receive an additional CRS in one or more resources corresponding to a CRS port that is to be ignored by legacy UEs.

In a twenty-eighth aspect, in combination with the twenty-seventh aspect, the additional CRS is scrambled based at least in part on at least one of a cell identifier, a symbol number, or a frame number.

Figure 10:
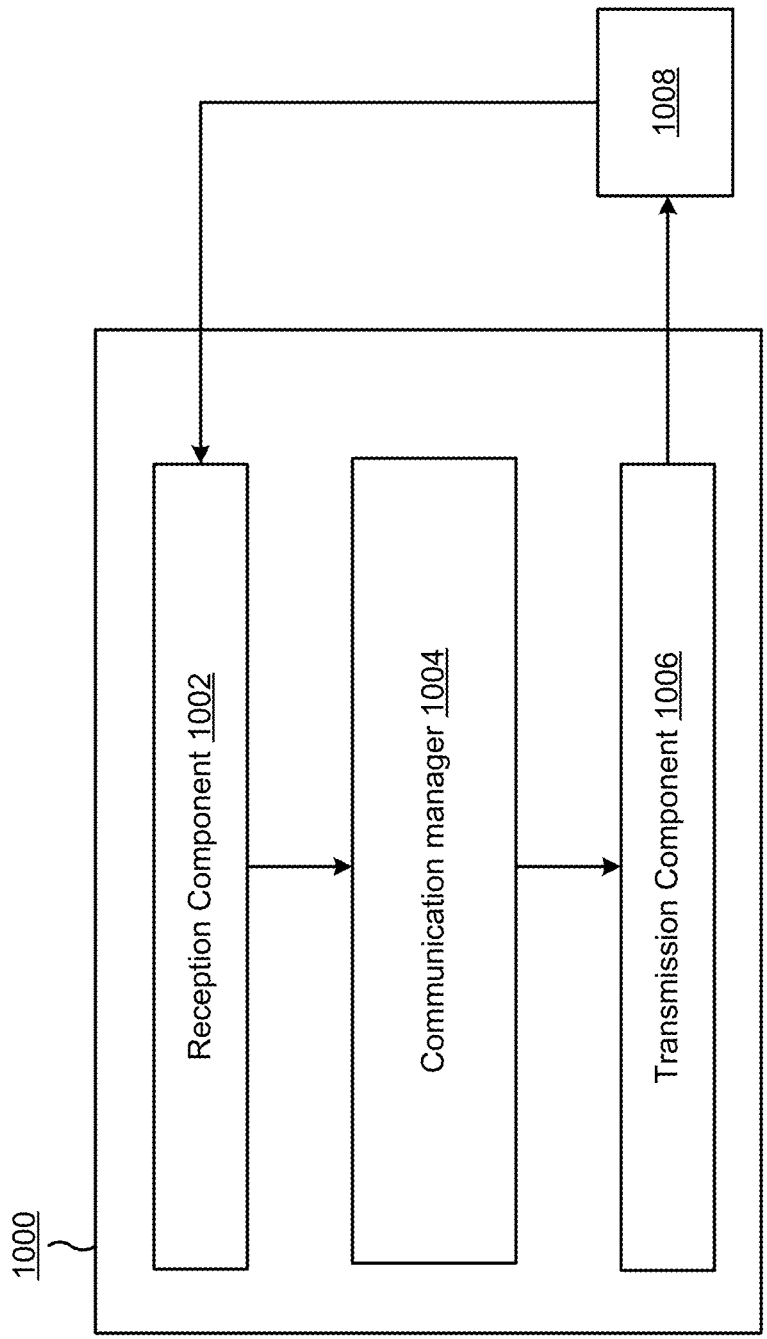
FIGS. 10 and 11 are block diagrams of example apparatuses for wireless communication in accordance with various aspects of the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIGS. 7A-7D. Additionally or alternatively, the apparatus 1000 may be configured to perform one or more processes described herein, such as process 800 of FIG. 8. In some aspects, the apparatus 1000 may include one or more components of the UE described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the UE described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the UE described above in connection with FIG. 2. In some aspects, the transmission component 1006 may be collocated with the reception component 1002 in a transceiver.

The communication manager 1004 may receive or may cause the reception component 1002 to receive a master information block (MIB) including enhancement information associated with an enhanced cell acquisition subframe (CAS) for a cellular broadcast service; and may receive or may cause the reception component 1002 to receive the enhanced CAS, associated with the cellular broadcast service, based at least in part on the enhancement information associated with the enhanced CAS. In some aspects, the communication manager 1004 may include a controller/processor, a memory, or a combination thereof, of the UE described above in connection with FIG. 2.

In some aspects, the enhancement information includes an indication that the apparatus 1000 is to monitor an enhanced PDCCH candidate in a common search space of the enhanced CAS, and the communication manager 1004, when receiving the enhanced CAS or causing the reception component 1002 to receive the enhanced CAS, may monitor or may cause the reception component 1002 to monitor the enhanced PDCCH candidate in association with receiving a PDCCH included in the common search space of the enhanced CAS. The communication manager 1004 may receive or may cause reception component 1002 to receive the PDCCH in resources of the common search space of the enhanced CAS based at least in part on monitoring the enhanced PDCCH candidate. In some aspects, the communication manager 1004 may receive or may cause the reception component 1002 to combine the PDCCH with another PDCCH included in a common search space of another CAS based at least in part on an indication included in the MIB.

In some aspects, the communication manager 1004 may include a set of components associated with performing operations described herein. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
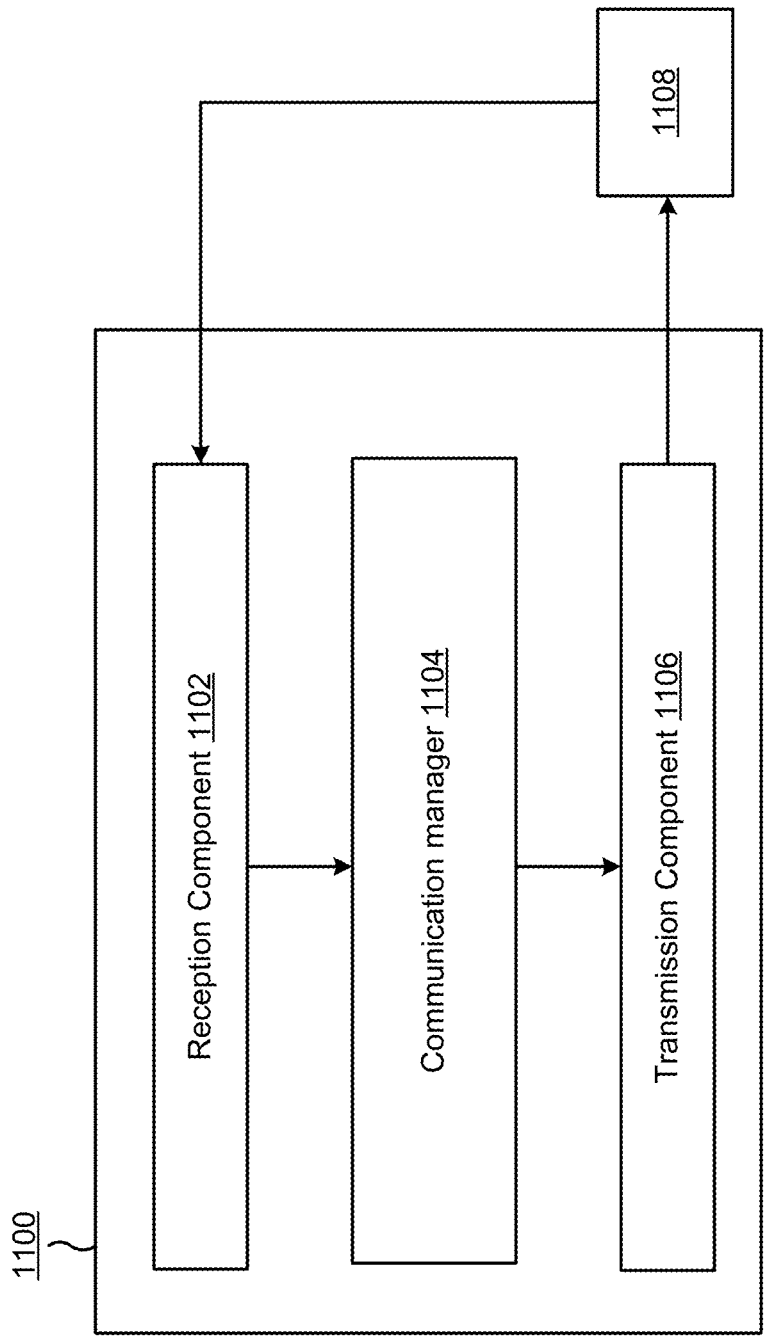

FIG. 11 is a block diagram of an example apparatus 1100 for wireless communication. The apparatus 1100 may be a base station, or a base station may include the apparatus 1100. In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a UE, a base station, or another wireless communication device) using the reception component 1102 and the transmission component 1106.

In some aspects, the apparatus 1100 may be configured to perform one or more operations described herein in connection with FIGS. 7A-7D. Additionally or alternatively, the apparatus 1100 may be configured to perform one or more processes described herein, such as process 900 of FIG. 9. In some aspects, the apparatus 1100 may include one or more components of the base station described above in connection with FIG. 2.

The reception component 1102 may receive communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the base station described above in connection with FIG. 2.

The transmission component 1106 may transmit communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the base station described above in connection with FIG. 2. In some aspects, the transmission component 1106 may be collocated with the reception component 1102 in a transceiver.

The communication manager 1104 may or may cause transmission component 1106 to transmit a master information block (MIB) including enhancement information associated with an enhanced cell acquisition subframe (CAS) for a cellular broadcast service; and may transmit or may cause transmission component 1106 to transmit the enhanced CAS, associated with the cellular broadcast service, based at least in part on the enhancement information associated with the enhanced CAS. In some aspects, the communication manager 1104 may include a controller/processor, a memory, a scheduler, a communication unit, or a combination thereof, of the base station described above in connection with FIG. 2.

In some aspects, the enhancement information includes an indication that a UE is to monitor an enhanced PDCCH candidate in a common search space of the enhanced CAS, and the communication manager 1104, when transmitting the enhanced CAS or causing the transmission component 1106 to transmit the enhanced CAS, may generate or cause the transmission component 1106 to generate the PDCCH to be transmitted in resources of the enhanced PDCCH candidate in the common search space of the enhanced CAS associated with the cellular broadcast service. The communication manager 1104 may transmit or may cause transmission component 1106 to transmit the PDCCH in the resources of the enhanced PDCCH candidate in the common search space of the enhanced CAS associated with the cellular broadcast service. In some aspects, the communication manager 1104 may encode or may cause transmission component 1106 to encode control information, included in the PDCCH, such that the control information is decodable by a legacy user equipment configured to monitor the legacy PDCCH candidate in the common search space of the enhanced CAS.

In some aspects, the communication manager 1104 may include a set of components. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a master information block (MIB) including enhancement information associated with an enhanced cell acquisition subframe (CAS) for a cellular broadcast service, wherein the enhancement information includes an indication that the UE is to monitor an enhanced physical downlink control channel (PDCCH) candidate in a common search space of the enhanced CAS; and
   receiving the enhanced CAS, associated with the cellular broadcast service, based at least in part on the enhancement information associated with the enhanced CAS.

2. The method of claim 1, wherein receiving the enhanced CAS comprises:
   monitoring the enhanced PDCCH candidate in association with receiving a PDCCH included in the common search space of the enhanced CAS, the enhanced PDCCH candidate having an aggregation level greater than a legacy maximum aggregation level, and having at least one resource in common with a legacy PDCCH candidate in the common search space of the enhanced CAS; and
   receiving the PDCCH in resources of the common search space of the enhanced CAS based at least in part on monitoring the enhanced PDCCH candidate.

3. The method of claim 2, wherein the legacy maximum aggregation level is eight.

4. The method of claim 2, wherein control information, included in the PDCCH, is decodable by a legacy UE configured to monitor the legacy PDCCH candidate in the common search space of the enhanced CAS.

5. The method of claim 2, wherein control information, included in the PDCCH, comprises a single encoded bit stream,
   wherein the control information is decodable from a first portion of the single encoded bit stream based at least in part on monitoring the legacy PDCCH candidate, and
   wherein the control information is decodable from the first portion of the single encoded bit stream and a second portion of the single encoded bit stream based at least in part on monitoring the enhanced PDCCH candidate.

6. The method of claim 5, further comprising descrambling or rotating the second portion of the single encoded bit stream based at least in part on a characteristic associated with the enhanced CAS.

7. The method of claim 2, further comprising combining the PDCCH with another PDCCH included in a common search space of another CAS based at least in part on an indication included in the MIB.

8. The method of claim 1, wherein the enhanced PDCCH candidate has an aggregation level of 16.

9. The method of claim 1, wherein the enhancement information further includes information that identifies a number of symbols associated with a PDCCH.

10. The method of claim 1, wherein the enhancement information further includes at least one of:
   information that identifies a quantity of blind decoding attempts that the UE is to perform in association with receiving a PDCCH in the common search space of the enhanced CAS,
   an indication that the UE is not to monitor at least one legacy PDCCH candidate in the common search space of the enhanced CAS, or
   an indication that the UE is to perform a single decoding attempt in the common search space of the enhanced CAS.

11. The method of claim 1, wherein the enhancement information further includes an indication of whether a particular CAS enhancement is active in the enhanced CAS.

12. The method of claim 1, wherein the enhancement information further includes an indication that the UE is to skip decoding of a PDCCH, wherein the indication includes information that identifies at least one of:
   a start symbol of a physical downlink shared channel (PDSCH),
   a number of control symbols associated with skipping the decoding of the PDCCH;
   a transport block size of a system information block associated with skipping the decoding of the PDCCH;
   a resource allocation of the system information block associated with skipping the decoding of the PDCCH; or
   a subframe associated with skipping the decoding of the PDCCH.

13. A method of wireless communication performed by a base station, comprising:

transmitting a master information block (MIB) including enhancement information associated with an enhanced cell acquisition subframe (CAS) for a cellular broadcast service, wherein the enhancement information includes an indication that a user equipment (UE) is to monitor an enhanced physical downlink control channel (PDCCH) candidate in a common search space of the enhanced CAS; and transmitting the enhanced CAS, associated with the cellular broadcast service, based at least in part on the enhancement information associated with the enhanced CAS.

14. The method of claim 13, wherein transmitting the enhanced CAS comprises:

generating the PDCCH to be transmitted in resources of the enhanced PDCCH candidate in the common search space of the enhanced CAS associated with the cellular broadcast service, the enhanced PDCCH candidate having an aggregation level greater than a legacy maximum aggregation level, and having at least one resource in common with a legacy PDCCH candidate in the common search space of the enhanced CAS; and transmitting the PDCCH in the resources of the enhanced PDCCH candidate in the common search space of the enhanced CAS associated with the cellular broadcast service.

15. The method of claim 14, wherein the legacy maximum aggregation level is eight.

16. The method of claim 14, further comprising encoding control information, included in the PDCCH, such that the control information is decodable by a legacy user equipment configured to monitor the legacy PDCCH candidate in the common search space of the enhanced CAS.

17. The method of claim 14, wherein control information, included in the PDCCH, comprises a single encoded bit stream, wherein the control information is decodable from a first portion of the single encoded bit stream based at least in part on monitoring the legacy PDCCH candidate, and wherein the control information is decodable from the first portion of the single encoded bit stream and a second portion of the single encoded bit stream based at least in part on monitoring the enhanced PDCCH candidate.

18. The method of claim 17, wherein the second portion of the single encoded bit stream is to be descrambled or rotated based at least in part on a characteristic associated with the enhanced CAS.

19. The method of claim 14, wherein the enhancement information further includes an indication that the UE is to combine the PDCCH with another PDCCH included in a common search space of another CAS.

20. The method of claim 13, wherein the enhanced PDCCH candidate has an aggregation level of 16.

21. The method of claim 13, wherein the enhancement information further includes information that identifies a number of symbols associated with a PDCCH.

22. The method of claim 13, wherein the enhancement information further includes at least one of:

information that identifies a quantity of blind decoding attempts that the UE is to perform in association with receiving a PDCCH in the common search space of the enhanced CAS, an indication that the UE is not to monitor at least one legacy PDCCH candidate in the common search space of the enhanced CAS, or an indication that the UE is to perform a single decoding attempt in the common search space of the enhanced CAS.

23. The method of claim 13, wherein the enhancement information further includes an indication of whether a particular CAS enhancement is active in the enhanced CAS.

24. The method of claim 13, wherein the enhancement information further includes an indication that the UE is to skip decoding of a PDCCH, wherein the indication includes information that identifies at least one of:

a start symbol of a physical downlink shared channel (PDSCH), a number of control symbols associated with skipping the decoding of the PDCCH, a transport block size of a system information block associated with skipping the decoding of the PDCCH, a resource allocation associated with skipping the decoding of the PDCCH, or a subframe associated with skipping the decoding of the PDCCH.

25. A user equipment (UE) for wireless communication, comprising:

a memory; and one or more processors operatively coupled to the memory, the one or more processors configured to:

receive a master information block (MIB) including enhancement information associated with an enhanced cell acquisition subframe (CAS) for a cellular broadcast service, wherein the enhancement information includes an indication that the UE is to monitor an enhanced physical downlink control channel (PDCCH) candidate in a common search space of the enhanced CAS; and receive the enhanced CAS, associated with the cellular broadcast service, based at least in part on the enhancement information associated with the enhanced CAS.

26. The UE of claim 25, wherein the one or more processors, when receiving the enhanced CAS, are to:

monitor the enhanced PDCCH candidate in association with receiving a PDCCH included in the common search space of the CAS, the enhanced PDCCH candidate having an aggregation level greater than a legacy maximum aggregation level, and having at least one resource in common with a legacy PDCCH candidate in the common search space of the enhanced CAS; and receive the PDCCH in resources of the common search space based at least in part on monitoring the enhanced PDCCH candidate.

27. The UE of claim 26, wherein control information, included in the PDCCH, is decodable by a legacy UE configured to monitor the legacy PDCCH candidate in the common search space of the enhanced CAS.

28. A base station for wireless communication, comprising:

a memory; and one or more processors operatively coupled to the memory, the one or more processors configured to:

transmit a master information block (MIB) including enhancement information associated with an enhanced cell acquisition subframe (CAS) for a cellular broadcast service, wherein the enhancement information includes an indication that a user equipment (UE) is to monitor an enhanced physical downlink control channel (PDCCH) candidate in a common search space of the enhanced CAS; and transmit the enhanced CAS, associated with the cellular broadcast service, based at least in part on the enhancement information associated with the enhanced CAS.

29. The base station of claim 28, wherein the one or more processors, when transmitting the enhanced CAS, are to:
generate the PDCCH to be transmitted in resources of the enhanced PDCCH candidate in the common search space of the enhanced CAS associated with the cellular broadcast service,
the enhanced PDCCH candidate having an aggregation level greater than a legacy maximum aggregation level, and having at least one resource in common with a legacy PDCCH candidate in the common search space of the enhanced CAS; and
transmit the PDCCH in the resources of the enhanced PDCCH candidate in the common search space of the CAS associated with the cellular broadcast service.

30. The base station of claim 29, wherein the one or more processors are further to encode control information, included in the PDCCH, such that the control information is decodable by a legacy user equipment configured to monitor the legacy PDCCH candidate in the common search space of the enhanced CAS.

* * * * *